US010511566B2

(12) United States Patent
Shah et al.

(10) Patent No.: US 10,511,566 B2
(45) Date of Patent: Dec. 17, 2019

(54) MANAGED DIRECTORY SERVICE WITH EXTENSION

(71) Applicant: Amazon Technologies, Inc., Reno, NV (US)

(72) Inventors: Shon Kiran Shah, Redmond, WA (US); Thomas Christopher Rizzo, Sammamish, WA (US); Gaurang Pankaj Mehta, Seattle, WA (US); Guruprakash Bangalore Rao, Bellevue, WA (US); Sameer Palande, Seattle, WA (US); Krithi Rai, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 14/098,454

(22) Filed: Dec. 5, 2013

(65) Prior Publication Data
US 2015/0134827 A1 May 14, 2015

Related U.S. Application Data

(60) Provisional application No. 61/902,790, filed on Nov. 11, 2013.

(51) Int. Cl.
H04L 29/12 (2006.01)
G06F 9/455 (2018.01)
(Continued)

(52) U.S. Cl.
CPC .......... H04L 61/1547 (2013.01); G06F 9/455 (2013.01); G06F 9/45558 (2013.01);
(Continued)

(58) Field of Classification Search
CPC ............ H04L 63/0815; H04L 63/0272; H04L 63/104; H04L 63/10; H04L 61/1535;
(Continued)

(56) References Cited

U.S. PATENT DOCUMENTS 6,055,637 A 4/2000 Hudson et al.
6,209,036 B1 3/2001 Aldred et al.
(Continued)

FOREIGN PATENT DOCUMENTS

FR 2964813 3/2012
JP 2004355439 12/2004
(Continued)

OTHER PUBLICATIONS

International Search Report and Written Opinion dated Feb. 4, 2015, International Patent Application No. PCT/US2014/064894, filed Nov. 10, 2014, 14 pages.
(Continued)

Primary Examiner — Jungwon Chang
(74) Attorney, Agent, or Firm — Davis Wright Tremaine LLP

(57) ABSTRACT

Techniques for connecting computer system entities to remotely extended local computer system resources are described herein. A computer system entity that requests access to a local computer system resource has that request fulfilled by a managed directory service which receives the request and connects the computer system entity to the local computer system resource. While connected, the managed directory service extends the local computer system resource to a corresponding extended remote computer system resource, receives commands to perform operations on the local or extended remote computer system resources and, if the computer system entity is authorized to perform the operations on the appropriate computer system resource, the
(Continued)

US 10,511,566 B2

Page 2 managed directory service performs the operations on the appropriate computer system resource.

18 Claims, 13 Drawing Sheets

(51) Int. Cl.
- *H04L 29/06* (2006.01)
- *G06F 21/60* (2013.01)
- *H04L 29/08* (2006.01)
- *H04L 12/24* (2006.01)

(52) U.S. Cl.
CPC ........ *G06F 21/604* (2013.01); *H04L 41/5009* (2013.01); *H04L 63/08* (2013.01); *H04L 63/102* (2013.01); *H04L 67/10* (2013.01); *H04L 67/1095* (2013.01); *H04L 67/16* (2013.01); *G06F 2009/45562* (2013.01); *G06F 2009/45587* (2013.01); *G06F 2009/45595* (2013.01); *G06F 2221/2141* (2013.01); *H04L 41/5041* (2013.01); *H04L 41/5058* (2013.01); *H04L 41/5083* (2013.01); *H04L 61/1541* (2013.01); *H04L 61/2007* (2013.01); *H04L 63/104* (2013.01)

(58) Field of Classification Search
CPC ............. H04L 61/1547; H04L 61/1505; H04L 63/0892; H04L 63/0281; H04L 63/083; H04L 63/08; H04L 63/0876; H04L 65/1016; H04L 61/1541; H04L 61/2007; H04L 63/102; H04L 67/10; H04L 67/16; H04L 67/1095; H04L 41/5009; H04L 41/5058; H04L 41/5041; H04L 41/5083; G06F 21/6218; G06F 2221/2141; G06F 17/30581; G06F 17/3089; G06F 17/30233; G06F 17/30575; G06F 17/30867; G06F 21/604; G06F 3/0605; G06F 2009/45587; G06F 2221/214; G06F 21/31; G06F 9/455; G06F 9/45558; G06F 2009/45562; G06F 2009/45595
USPC ..... 709/226, 248, 227, 203; 726/1, 4, 6, 12; 707/639, 790, 831; 370/352
See application file for complete search history.

(56) References Cited

U.S. PATENT DOCUMENTS

| | | | |
|---|---|---|---|
| 6,609,128 B1 | 8/2003 | Underwood | |
| 7,574,202 B1 | 8/2009 | Tsao et al. | |
| 8,045,486 B2 | 10/2011 | Swan | |
| 8,145,798 B1* | 3/2012 | Buck | H04L 41/0806 709/203 |
| 8,224,994 B1 | 7/2012 | Schneider | |
| 8,255,984 B1 | 8/2012 | Ghostine et al. | |
| 8,307,003 B1* | 11/2012 | Sheth | G06F 17/3089 707/790 |
| 8,346,824 B1 | 1/2013 | Lyle et al. | |
| 8,533,796 B1 | 9/2013 | Shenoy et al. | |
| 8,656,471 B1 | 2/2014 | Allen et al. | |
| 8,856,506 B2 | 10/2014 | Weber et al. | |
| 9,213,513 B2 | 12/2015 | Hartz et al. | |
| 9,639,384 B2 | 5/2017 | Govindnkutty et al. | |
| 9,678,769 B1 | 6/2017 | Scott et al. | |
| 2002/0143943 A1 | 10/2002 | Lee et al. | |
| 2003/0074448 A1 | 4/2003 | Kinebuchi et al. | |
| 2003/0229645 A1* | 12/2003 | Mogi | G06F 3/0605 |
| 2004/0205152 A1 | 10/2004 | Yasuda et al. | |
| 2005/0102513 A1 | 5/2005 | Alve | |
| 2005/0203993 A1 | 9/2005 | Grobman et al. | |
| 2006/0059252 A1 | 3/2006 | Tatsubori et al. | |
| 2007/0112877 A1* | 5/2007 | Harvey | H04L 29/12047 |
| 2007/0143829 A1 | 6/2007 | Hinton et al. | |
| 2007/0300220 A1 | 12/2007 | Seliger et al. | |
| 2007/0300221 A1 | 12/2007 | Hartz et al. | |
| 2008/0016143 A1 | 1/2008 | Bumpus et al. | |
| 2008/0046593 A1 | 2/2008 | Ando et al. | |
| 2008/0140618 A1 | 6/2008 | Kumar | |
| 2008/0208853 A1 | 8/2008 | Vismans et al. | |
| 2008/0320566 A1 | 12/2008 | Herzog et al. | |
| 2009/0089625 A1 | 4/2009 | Kannappan et al. | |
| 2009/0112875 A1 | 4/2009 | Maes | |
| 2009/0157850 A1 | 6/2009 | Gagliardi et al. | |
| 2009/0178132 A1* | 7/2009 | Hudis | G06F 17/30867 726/12 |
| 2009/0198835 A1* | 8/2009 | Madhusudanan | G06F 17/30575 709/248 |
| 2009/0249439 A1 | 10/2009 | Olden et al. | |
| 2009/0288084 A1 | 11/2009 | Astete et al. | |
| 2009/0328178 A1 | 12/2009 | McDaniel et al. | |
| 2010/0017889 A1 | 1/2010 | Newstadt et al. | |
| 2010/0122248 A1 | 5/2010 | Robinson et al. | |
| 2010/0142401 A1 | 6/2010 | Morris | |
| 2010/0254375 A1 | 10/2010 | Feuerhahn et al. | |
| 2011/0066668 A1* | 3/2011 | Guarraci | G06F 17/30233 707/831 |
| 2011/0099147 A1* | 4/2011 | McAlister | G06F 17/30581 707/639 |
| 2011/0185355 A1 | 7/2011 | Chawla et al. | |
| 2011/0191834 A1 | 8/2011 | Singh et al. | |
| 2011/0251992 A1 | 10/2011 | Bethlehem et al. | |
| 2011/0314520 A1* | 12/2011 | Olszewski | H04L 63/104 726/4 |
| 2012/0011578 A1 | 1/2012 | Hinton et al. | |
| 2012/0017271 A1 | 1/2012 | Smith et al. | |
| 2012/0030673 A1 | 2/2012 | Sakamoto | |
| 2012/0066348 A1 | 3/2012 | Alnas | |
| 2012/0110055 A1 | 5/2012 | Van Biljon et al. | |
| 2012/0110574 A1 | 5/2012 | Kumar | |
| 2012/0179802 A1* | 7/2012 | Narasimhan | H04L 41/046 709/223 |
| 2012/0179820 A1 | 7/2012 | Ringdahl et al. | |
| 2012/0198022 A1 | 8/2012 | Black et al. | |
| 2012/0233314 A1 | 9/2012 | Jakobsson | |
| 2012/0246738 A1 | 9/2012 | Shah et al. | |
| 2012/0266168 A1 | 10/2012 | Spivak et al. | |
| 2012/0281708 A1 | 11/2012 | Chauhan et al. | |
| 2012/0290630 A1 | 11/2012 | Aizman et al. | |
| 2013/0007845 A1 | 1/2013 | Chang et al. | |
| 2013/0034021 A1 | 2/2013 | Jaiswal et al. | |
| 2013/0042115 A1 | 2/2013 | Sweet et al. | |
| 2013/0054639 A1 | 2/2013 | Sharma et al. | |
| 2013/0066834 A1 | 3/2013 | McAlister et al. | |
| 2013/0167145 A1 | 6/2013 | Krishnamurthy et al. | |
| 2013/0174216 A1 | 7/2013 | Simske et al. | |
| 2013/0191828 A1 | 7/2013 | Wells et al. | |
| 2013/0198340 A1 | 8/2013 | Ukkola et al. | |
| 2013/0227140 A1 | 8/2013 | Hinton et al. | |
| 2013/0230042 A1* | 9/2013 | Shatsky | H04L 65/1016 370/352 |
| 2013/0238808 A1* | 9/2013 | Hallem | H04L 63/0281 709/227 |
| 2013/0247036 A1 | 9/2013 | Fujiwara | |
| 2013/0254847 A1* | 9/2013 | Adams | G06F 21/6218 726/4 |
| 2013/0283270 A1 | 10/2013 | Holland et al. | |
| 2013/0283298 A1 | 10/2013 | Ali et al. | |
| 2014/0040993 A1 | 2/2014 | Lorenzo et al. | |
| 2014/0075501 A1 | 3/2014 | Srinivasan et al. | |
| 2014/0201735 A1 | 7/2014 | Kannan et al. | |
| 2014/0250075 A1 | 9/2014 | Broido et al. | |
| 2014/0282510 A1 | 9/2014 | Anderson et al. | |
| 2014/0298398 A1* | 10/2014 | Neely | H04L 63/10 726/1 |
| 2014/0325622 A1* | 10/2014 | Luk | H04L 63/083 726/6 |
| 2014/0365549 A1 | 12/2014 | Jenkins | |

(56) References Cited

U.S. PATENT DOCUMENTS

| | | |
|---|---|---|
| 2015/0058837 A1 | 2/2015 | Govindankutty et al. |
| 2015/0089061 A1 | 3/2015 | Li et al. |
| 2015/0237149 A1 | 8/2015 | MacInnis |
| 2017/0337071 A1 | 11/2017 | Scott et al. |

FOREIGN PATENT DOCUMENTS

| | | |
|---|---|---|
| JP | 2005004648 | 1/2005 |
| JP | 2005258672 | 9/2005 |
| JP | 2009519530 | 5/2009 |
| JP | 2009176097 | 8/2009 |
| JP | 2010027028 | 2/2010 |
| JP | 2010092475 | 4/2010 |
| JP | 2011186637 | 9/2011 |
| JP | 2012032956 | 2/2012 |
| JP | 2012123459 | 6/2012 |
| JP | 2013084235 | 5/2013 |
| JP | 2013527532 | 6/2013 |
| JP | 2013532854 | 8/2013 |
| JP | 2013540314 | 10/2013 |
| JP | 2015503782 | 2/2015 |
| JP | 2016540295 | 12/2016 |
| WO | WO2011106716 | 9/2011 |
| WO | WO2013146537 | 10/2013 |

OTHER PUBLICATIONS

International Search Report and Written Opinion dated Feb. 19, 2015, International Patent Application No. PCT/US2014/065084, filed Nov. 11, 2014, 15 pages.
International Search Report and Written Opinion dated Feb. 11, 2015, International Patent Application No. PCT/US2014/065081, filed Nov. 11, 2014, 11 pages.
International Search Report and Written Opinion dated Feb. 23, 2015, International Patent Application No. PCT/US2014/065088, filed Nov. 11, 2014, 13 pages.
Bucicoiu et al., "Secure Cloud Video Streaming Using Tokens," RoEduNet Conference 13th Edition: Networking in Education and Research Joint Event RENAM 8th Conference, Jan. 2014, 6 pages.
Carrion et al., "A Generic Catalog and Repository Service for Virtual Machine Images," 2010, University of Valencia, retrieved from internet https://www.researchgate.net/profile/German_Molto/publication/233906883_A_Generic_Catalog_and_Repository_Service_for_Virtual_Machine_Images/links/0fcfd50cbb119a1184000000.pdf, 15 pages.
Anonymous, "Microsoft Windows Server 2008R2 Directory Services (DS) on Amazon EC2," Oct. 21, 2012, retrieved on May 10, 2017, from internet at https://web.archive.org/web/20121021194026/https://awsmedia.s3.amazonaws.com/pdf/EC2_AD_How_to.pdf, 8 pages.
Lopez et al., "Providing secure mobile access to information servers with temporary certificates," 1999, retrieved from http://ac.els-cdn.com/S138912869900105X/1-s2.0-S138912869900105X-main.pdf?_tid=8d31c448-e679-11e6-b14f-00000aacb35f&acdnat=1485732221_f0f3684af0254bee6476a83214f9cf32, 5 pages.
Japanese Patent Application No. 2016-528217, Decision to Grant a Patent, dated Jan. 15, 2018, filed Nov. 10, 2014, 6 pages.
Japanese Final Rejection, dated Dec. 18, 2017, for Patent Application No. 2016-528232, 6 pages.
Canadian Notice of Allowance for Patent Application No. 2,930,253 dated Dec. 7, 2017, 1 page.
Canadian Office Action for Patent Application No. 2,930,292 dated Feb. 9, 2018, 4 pages.
Japanese Office Action, dated Oct. 11, 2017, for Application No. 2016-528219, 10 pages.
Anonymous, "vCloud Automation Center Operating Guide for vCloud Automation Center 5.2," VMware, Jul. 17, 2013, retrieved on May 8, 2017, from https://web-beta.archive.org/web/20130717235803/http://www.vmware.com/pdf/vcac-52-operating-guide.pdf, 332 pages.
Canadian Office Action for Patent Application No. 2,930,281 dated Nov. 23, 2017, 6 pages.
Canadian Office Action for Patent Application No. 2,930,255 dated Apr. 16, 2018, 5 pages.
European Communication pursuant to Article 94(3) EPC dated Apr. 17, 2018, for Application No. 14859670.3, 3 pages.
Chinese First Office Action for Patent Application No. 201480068732.2 dated Jun. 15, 2018, 12 pages.
Chinese First Office Action for Patent Application No. 201480068869.8 dated Jun. 27, 2018, 12 pages.
Chinese First Office Action for Patent Application No. 201480072547.0 dated Jul. 2, 2018, 16 pages.
European Communication Under Rule 71(3) EPC for Application No. 14860094.3, Intention to Grant, dated Jul. 5, 2018, 57 pages.
European Communication under Rule 71(3) EPC for Application No. 14860654.4, Intention to Grant, dated Jul. 16, 2018, 149 pages.
European Communication under Rule 71(3) EPC for Application No. 14861058.7, Intention to Grant, dated Jun. 29, 2018, 55 pages.
Japanese Decision to Grant dated Jun. 11, 2018 for Patent Application No. 2016-528232, 6 pages.
Japanese Decision to Grant for Patent Application No. 2016-528219 dated Aug. 20, 2018, 6 pages.
Anonymous, "AWS Identity and Access Management Using IAM," dated Jun. 20, 2013, retrieved on Feb. 12, 2019 from https://web.archive.org/web/20130620090425if_/http://awsdocs.s3.amazonaws.com/IAM/latest/iam-ug.pdf, 219 pages.
Canadian Notice of Allowance for Patent Application No. 2,930,255 dated Apr. 2, 2019, 1 page.
Canadian Notice of Allowance for Patent Application No. 2,930,292 dated Feb. 1, 2019, 1 page.
Canadian Office Action, dated Oct. 22, 2018, for Patent Application No. 2,930,281, 4 pages.
Chinese First Office Action for Patent Application No. 201480068648.0 dated Dec. 12, 2018, 8 pages.
Chinese Notice of Grant for Patent Application No. 201480068732.2 dated Mar. 15, 2019, 4 pages.
Chinese Notice of Grant for Patent Application No. 201480068869.8 dated Mar. 14, 2019, 4 pages.
Chinese Second Office Action dated Jun. 25, 2019, for Patent Application No. 201480068648.0, 9 pages.
Chinese Second Office Action for Patent Application No. 201480068732.2 dated Nov. 21, 2018, 7 pages.
Chinese Second Office Action for Patent Application No. 201480072547.0, dated Feb. 11, 2019, 12 pages.
European Communication under Rule 71(3) EPC for Application No. 14859670.3, Intention to Grant, dated Jan. 3, 2019, 58 pages.
European Search Report dated Feb. 22, 2019, for Patent Application No. EP18204451, 9 pages.
Japanese First Office Action for Patent Application No. 2016-528217 dated Feb. 2, 2019, 5 pages.
Japanese Notice to Grant, dated Jul. 8, 2019, for Patent Application No. 2018-073523, 6 pages.
Japanese Office Action, dated Jun. 17, 2019, for Patent Application No. 2018-073523, 5 pages.
Canadian Office Action for Patent Application No. 2,930,281 dated Oct. 3, 2019, 5 pages.
Chinese Decision to Grant for Application No. 201480068648.0 dated Sep. 27, 2019, 4 pages.

\* cited by examiner

US 10,511,566 B2

MANAGED DIRECTORY SERVICE WITH EXTENSION

CROSS REFERENCE TO RELATED APPLICATIONS

This application claims the benefit of U.S. Provisional Application No. 61/902,790, filed on Nov. 11, 2013, entitled "MANAGED DIRECTORY SERVICE," the content of which is incorporated by reference herein in its entirety.

BACKGROUND

Modern computer systems frequently employ a combination of local and remote systems, resources and storage, distributing processing and storage across the system entities and sending requests for resources between the system entities. Because local and remote system elements may have different authorization and authentication systems, administrators of such systems may have to manage a plurality of accounts and credentials to allow users access to the resources provided by the distributed system. In some embodiments, connection credentials may include credentials such as user names, passwords, key phrases, biometric devices, hardware keys, virtual hardware keys and other such authentication and/or authorization credentials. Different approaches to managing the resources may also be required, depending on whether the resource is located on the customer premises (or locally), whether the resource is located at a computing resource service provider (or remotely) or whether the resource is located in a combination of both locally and remotely. Existing approaches that provide access of local and/or remote directories by services typically require multiple user accounts for the same user, causing additional costs, account maintenance problems and account security problems. Synchronization between directories on systems with multiple logins adds an additional layer of complexity. Replication across systems with multiple logins also means data may become accessible by others on the remote system, potentially leading to data vulnerabilities and more security problems.

BRIEF DESCRIPTION OF THE DRAWINGS

Various embodiments in accordance with the present disclosure will be described with reference to the drawings, in which.

DETAILED DESCRIPTION

Figure 1:
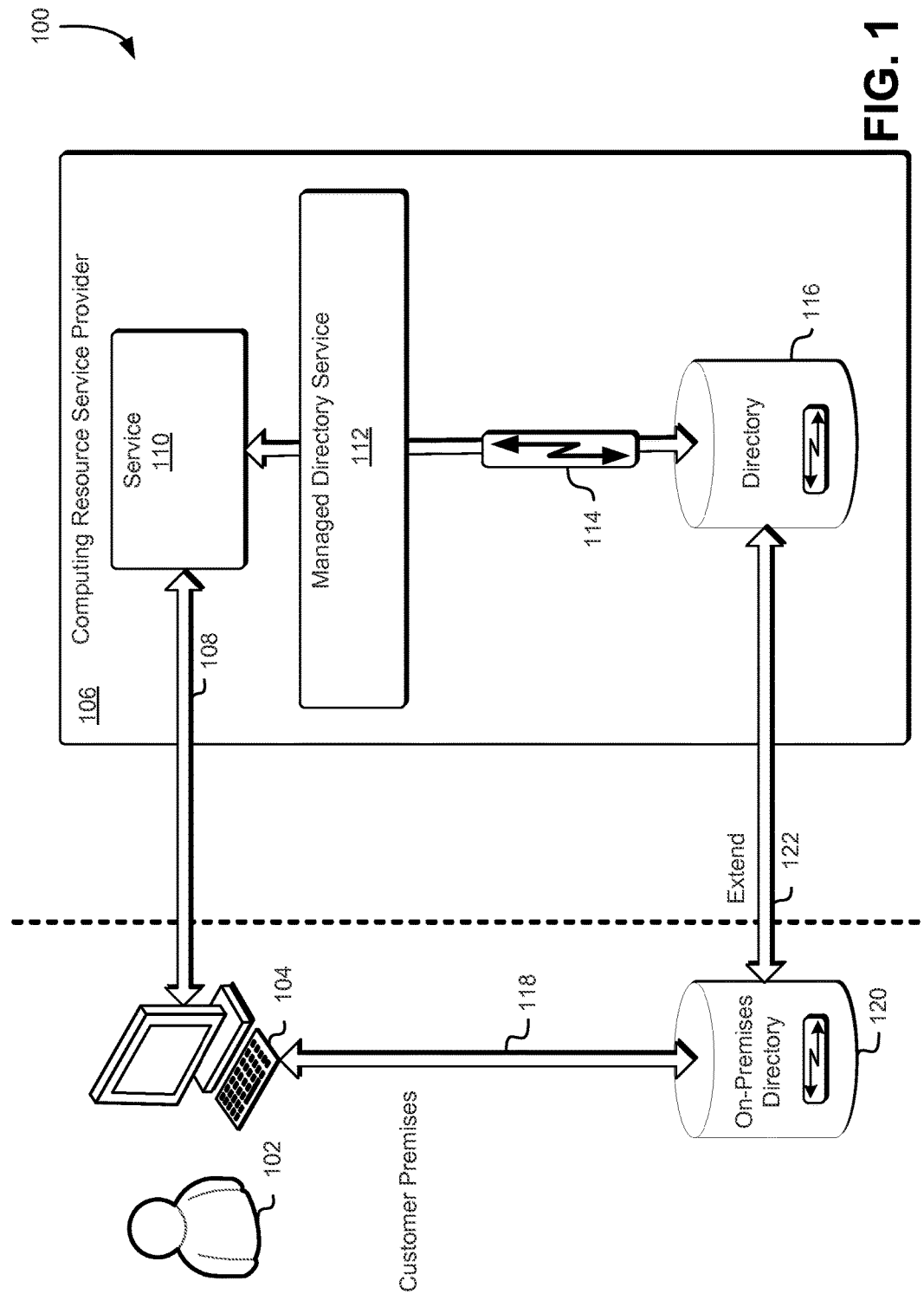
FIG. 1 illustrates an example environment where computer system directory resources may be accessed by computer system entities in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for managing local and/or remote resources on distributed and/or virtualized computer systems and executable code operating thereon. In particular, techniques are disclosed for utilizing system capabilities to facilitate and manage access to system resources such as directories, file systems, files, users, security policies, network resources, applications, system storage and the like, by and for computer system entities including, but not limited to, users, services, processes, applications, client devices, guest operating systems and/or other such computer system entities. A distributed and/or virtualized computer system may benefit from efficient management of local and/or remote system resources in order to facilitate better system performance, better access to system resources, higher availability of system resources, better data security, better user security and/or other such system benefits.

In an illustrative example, a distributed and/or virtualized computer system may have one or more computer system services including, but not limited to directory services and may have one or more system resources such as user resources, policy resources, network resources, storage resources and/or other such resources associated with the directory services located in a certain datacenter. The directory services and the system resources such as user resources, policy resources, network resources, storage resources and/or other such resources associated with the directory services may be collectively referred to herein in the present disclosure variously as system resources, computer system resources, services and resources, services and/or resources, or resources. Access to these services and/or system resources may be via a set of authentication credentials associated with one or more user accounts. In some embodiments, connection credentials may include credentials such as user names, passwords, key phrases, biometric devices, hardware keys, virtual hardware keys and other such authentication and/or authorization credentials. In some embodiments, a local customer datacenter may require local credentials for network access to system resources within the datacenter. A service that may be, for example, running in a computer resources service provider, may require access to the local system resource but may not have the local credentials to access system resources within the datacenter. A service which may provide access to the local system resource via a set of temporary credentials and link to the resource may facilitate access. Such a service may help manage the local system resource by providing operations to create, destroy, connect to, extend and/or other such management operations. Such management operations may be, in some embodiments, facilitated by policy subsystems that may manage authentication and authorization. In some embodiments, systems that manage local system resources for local and/or remote services may also be configured to manage remote and/or mixed local and remote system resources for local and/or remote services.

Techniques described and suggested herein include techniques related to the implementation and management of computer system services such as directory services and resources such as user resources, policy resources and/or storage resources associated with the directory services. In some embodiments, a managed directory service may be configured to provide the capabilities of a directory as a service (DaaS) which may include capabilities to manage system users, resources, policies, network access and/or security on a computer system. In some embodiments, a managed directory service may also be configured to manage access to such capabilities from distributed and/or virtualized computer system instances and may also be configured to manage access to such capabilities from other related distributed and/or virtualized computer system services.

For example, a user may create and access a virtual machine (VM) instance within a computing resource service provider and which may require access to system resources stored on a customer premises that may not be managed by the computing resource service provider. A managed directory service running on the computing resource service provider may be configured to access the customer premises directories via acquired credentials and may also be configured to provide the VM instance with access to the customer premises resource. In some embodiments, other such computer services resource provided services may also be provided with the access to the customer premises resources, so that, for example, a block data storage service may access data stored in a directory on the customer premises or a load balancer may instantiate an application from the customer premises for each instance it creates or a data warehouse may access customer premises file systems to automatically backup to a remote location.

In some embodiments, a managed directory service is configured to manage directory services such as user access, policies, stores, applications, security and/or other such resources on behalf of a computer system and may also be configured as an interface to those directory services. A managed directory service may be configured to manage directory services for a directory, such as an enterprise directory. A directory may contain a database of information about various objects in the directory. The objects may correspond to resources and security principals and, therefore, may contain user access objects, policy objects, store objects, applications link objects, security objects and/or other such objects. A directory database may also include relationships between those database objects, so that the directory is usable to manage, for example, which users have access to which stores.

A managed directory service may provide such services including, but not limited to creating directories. A managed directory service may create directories including, but not limited to, enterprise directories, DaaS and/or other such directories within the computing services resource provider, within the customer premises or in a combination of these and/or other such locations. Directories created within the computing services resource provider may be created as a standalone directory within a virtual machine running in the computing services resource provider or they may be created as a private directory located within a private and/or otherwise restricted subset of the computing services resource provider (e.g., a virtual network hosted and managed by a computing resource service provider on behalf of a customer who has provided (e.g., by application programming interface (API) calls) specifications for the virtual network and its topology). When a directory is created, a managed directory service may create a variety of additional resources to be associated with the directory to manage and/or provide resources for the directory and also, in some embodiments, to provide additional protection and redundancy for service failures, latency issues and/or other such service related issues. For example, a directory may be created with one or more machine instances that may be configured to act as servers for the directory, and/or it may be created with one or more routing services to provide address resolution for the directory or it may be created with a variety of other such services and/or resources. In some embodiments, a directory created within a computing services resource provider may create additional resources and/or entities within multiple regions of a multi-region distributed and/or virtualized system and/or may create additional resources within different subdomains of a multi-domain distributed and/or virtualized system.

In some embodiments, a managed directory service may be configured to interface with existing customer directory management systems such as those in an enterprise directory and to extend security and/or other such policies from those directory management systems to distributed and/or virtualized computer system services. In such embodiments, a directory resource may provide one or more API calls contained in one or more libraries that may be called by client applications, programs, services, processes and/or other such computer system entities to at least allow configuration, alteration, management and/or other such operations on the directory resource. In some embodiments, a customer directory management system may allow, for example, users from a certain department access to a certain suite of applications, a certain subset of storage locations, certain network resources and/or certain levels of secure access. A managed directory service may extend these policies to VM instances and other such services instantiated on distributed and/or virtualized computer systems by users from that certain department. In some embodiments, a managed directory service may extend such policies transparently and/or automatically so that, for example, a virtual machine instance instantiated for, or on the behalf of a user from that certain department may be instantiated with all requisite systems in place and all security and/or other policies already applied.

A managed directory service may also be configured to extend the availability of certain resources from the customer premises to a computing resource service provider. A resource such as a file system and/or a directory located on customer premises may be made available to services running on a computing resource service provider by, for example, providing a link to the resource when proper credentials are presented. In some embodiments, such a link may introduce an unacceptable latency due to, for example, network complexity or a significant distance between the computing resource service provider host machines and the customer premises. A managed directory service may be configured to address this unacceptable latency by at least partially extending the system resource to the computing resource service provider, providing low-latency access to reads and/or writes to the extended system resource while managing synchronization between the original resource on the customer premises and the extended resource on the computing resource service provider. The managed directory service may provide read-only access to the extended system resource or may, in some embodiments, provide read-write access to the extended system resource. In some embodiments where read/write access may be provided, the customer premises system resource may be designated the master, or the extended system resource provider may be designated the master or the two resources may negotiate which has authority in the event of, for example, write collisions. In some embodiments, resources may be extended to a plurality of locations including, but not limited to, multiple computing resource service providers, multiple regions within a computing resource service provider, multiple customer premises or combinations of these and/or other such locations.

A managed directory service may also be configured to migrate certain resources from the customer premises to a computing resource service provider and also to migrate certain resources from the computer services resources provider back to the customer premises. A managed directory service may be configured to create full and/or partial snapshots of computer system resources for the purposes of for example, creating backups, creating redundancy and/or other such purposes. For example, the extension operation described herein may, in some embodiments, take advantage of the ability of the managed directory service to create snapshots by creating at least a partial snapshot and copying that snapshot from the customer premises to the computing resource service provider. The managed directory service may also, in some embodiments, create a full snapshot of a computer system resource and may then copy that snapshot from the customer premises to the computing resource service provider or from the computer resources service provider to the customer premises. One or more of the computer services that were accessing the original computer system resource may then be altered to access the copy in the different location. In some embodiments, such migration may serve to reduce the load on certain resources, to migrate resources to certain centralized locations or for other such purposes.

FIG. 1 illustrates an environment 100 for accessing computer system directory resources such as directory services (referred to as simply "computer system directories" or "directories") and resources associated with such directory services including, but not limited to, user resources, policy resources, network resources and/or storage resources, on distributed and/or virtualized computer system environments as well as the associated code running thereon in accordance with at least one embodiment. A computer system entity, user or process 102 may connect to a computer system through a computer system client device 104 and may request access via connection 108 to one or more computer system services 110. In some embodiments, the command or commands to request access to the service may originate from an outside computer system and/or server, or may originate from an entity, user or process on a remote network location, or may originate from the computer system, or may originate from a user of the computer system client device, or may originate as a result of a combination of these and/or other such objects. The command or commands to request access to the service may, in some embodiments, be issued by a trusted user, or by a user, or by an autonomous process, or as a result of an alarm and/or other such condition or by a combination of these and/or other such methods.

The service or services may be running on a computing resource service provider 106 that may provide access to computer services such as virtual machine (VM) instances, automatic scaling groups, file-based database storage systems, block storage services, redundant data storage services, data archive services, data warehousing services, user access management services, content management services and/or other such computer system services. The computing resource service provider 106 may also provide access to computer system services such as directory services and resources such as user resources, policy resources, network resources and/or storage resources associated with the directory services. In some distributed and/or virtualized computer system environments, the resources associated with the computer services may be physical devices, virtual devices, combinations of physical and/or virtual devices or other such device embodiments.

The one or more services 110 of the computing resource service provider may, in some embodiments, require access to one or more directory resources including, but not limited to, directory services and resources such as user resources, policy resources, network resources and/or storage resources associated with the directory services. In some embodiments, access to the directory may include receiving a request to create a directory using one or more API calls. In some embodiments, the directory may be created within the computing resource service provider, or within a customer premises datacenter, or within an isolated virtual network within the computing resource service provider, or within a subnet of an isolated virtual network, or within a virtual network within a customer premises datacenter or within some other such location. In some embodiments, access to the directory may include other operations on the directory such as operations to manage the directory on behalf of a client and/or customer.

In some embodiments, where the system resource or resources may be a local system resource 120 such as an on-premises directory located on the customer premises, the computer system client device 104 may have access 118 to the local system resource 120, while the one or more services 110 may not have direct access to the local system resource. In such embodiments, the computer services resources provider may be provided with access to the local system resource by 122 extending the local system resource to a 116 system resource such as a directory which may then be associated with the 110 service via one or more 114 links or locators such as, for example, by a uniform resource identifier (URI) or some other such link. The system resource may be extended by copying at least a portion of the contents, state and/or structure from the local system resource to the remote system resource. For example, in some embodiments where the local system resource is a file system, the remote system resource may copy the structure of, some or all of the contents of and some or all of the state of the local file system to the remote file system so that the remote file system may function as an extension of the local file system. In some embodiments, depending on the type of access that the one or more services have to the remote file system resource, read and write blocking, write synchronization, master-slave designations and/or other system access polices may be implemented for the link such as a 114.

In some embodiments, the link such as a URI 114 may be managed by a service running on the computing resource service provider such as a managed directory service 112 which may be configured to at least provide access to computer system resources to one or more computer system services via one or more links or locators. The link may be provided by a process running within computing resource service provider, or by a process running within the customer premises, or by a process running on a computer system connected to the computing resource service provider, or by a process running on a computer system connected to the customer premises, or by the managed directory service or by a combination of these and/or other such computer system entities. In some embodiments, the process or processes that provide and/or manage the links and/or locators for the managed directory service as well as other processes associated with and/or under the control of the managed directory service may run on computer system entities and/or may use computer system resources within the computing resource service provider, or on the customer premises or on a combination of these and/or other such local and/or remote locations from the computing resource service provider.

Figure 2:
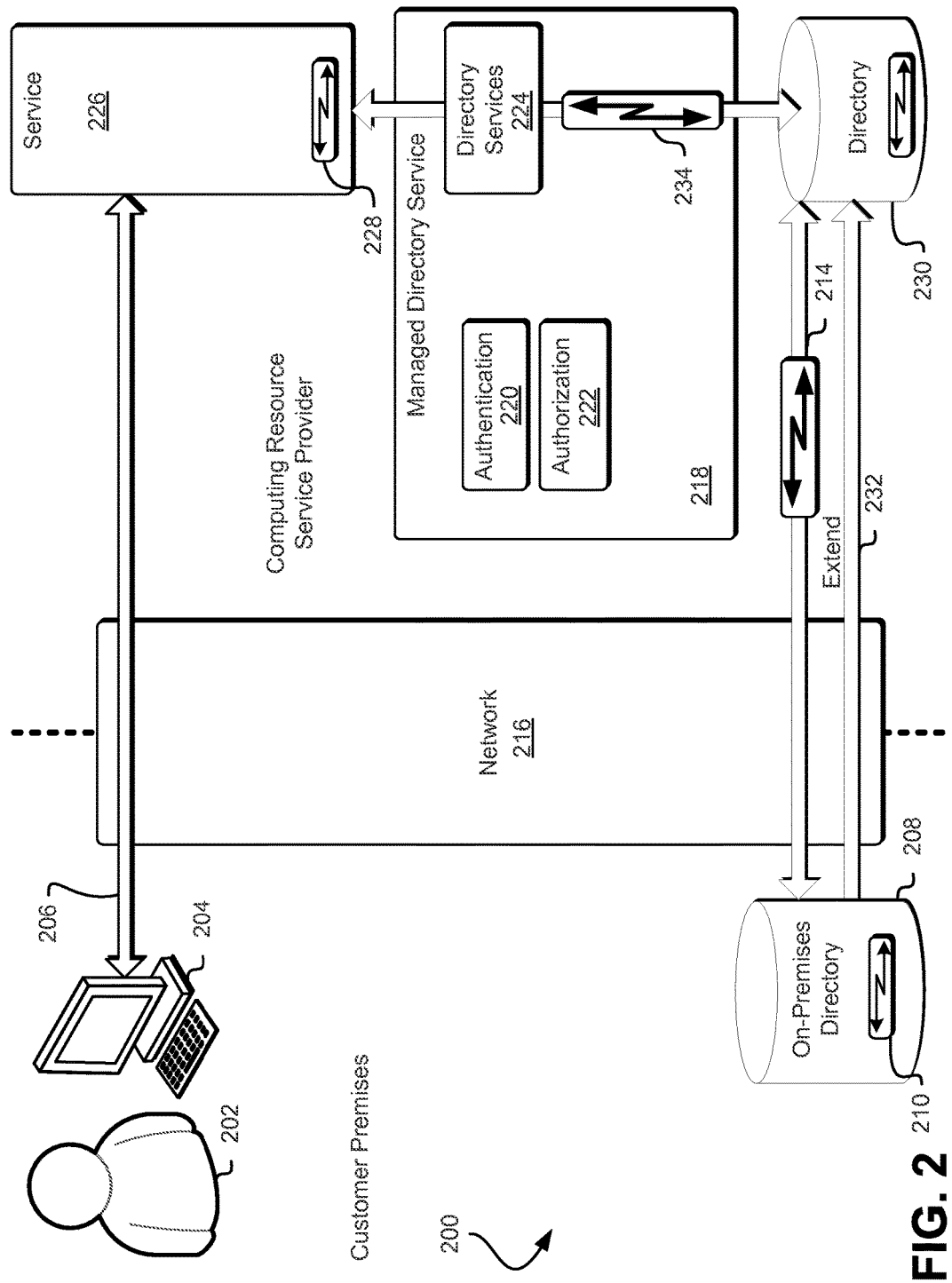
FIG. 2 illustrates an example environment where computer system resources may be accessed by computer system entities in accordance with at least one embodiment.

FIG. 2 illustrates an environment 200 for accessing computer system directory resources including, but not limited to, computer system services such as directory services and resources such as user resources, policy resources, network resources and/or storage resources associated with the directory services, on distributed and/or virtualized computer system environments as well as the associated code running thereon in accordance with at least one embodiment. A computer system entity, user or process 202 may connect to other computer systems through a computer system client device 204 and may request access via connection 206 to one or more services 226. The command or commands to request access to a service may originate from an outside computer system and/or server or may originate from an entity, user or process on a remote network location. The command or commands to request access to a service may, in some embodiments, be issued by a privileged user, or by an unprivileged user, or by an autonomous process, or as a result of an alarm or condition or by a combination of these and/or other methods.

The computer system client device 204 may request access to services via one or more networks 216 and/or entities associated therewith, such as other servers connected to the network, either directly or indirectly. As mentioned above, access may include the ability to create the directory in a variety of configurations and locations as well as access to other directory management operations. In some embodiments, the directory may be created and configured such that virtual machines and/or other clients may join to a domain of the directory and thereby access the directory. For example, a directory may be created within a computing resource service provider and configured to allow virtual machines and/or other clients to join the directory as needed. Clients that may require access to the directory may do so by joining to a domain of the directory using one or more authenticated connections and/or one or more authorized API calls. A directory created within a computing resource service provider may, in some embodiments, be created within an isolated virtual network or within a subnet of an isolated virtual network. An isolated virtual network is a customer configured, isolated subsection of the computing resource service provider that provides one or more computing resource service provider services to the customer in a secure and isolated virtual network environment that is not directly accessible to other services within the computer resource service provider. Access to resources created within the isolated virtual network may only be available to other services and entities within the isolated virtual network and, in an embodiment where the resources are created within a subnet of the isolated virtual network, the resources may only be available to other services and entities within that subnet.

The computer system client device 204 that may request access to the directory may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the customer premises may include one or more directories 208, which may be located at least in part on the customer premises and which may store files and/or other computer system resources thereon including, but not limited to, directories, applications, data, databases, links to other computer system resources, system drivers, computer operating systems, virtual machines and/or other such resources. In some embodiments, the computer system resources may be file system resources and may be stored on a variety of storage devices such as system random access memory (RAM), disk drives, solid state drives, removable drives or combinations of these and/or other such storage devices. In some embodiments, the computer system resources may be located at least in part in a datacenter (a plurality of computer system resources, services and/or storage devices that may be collocated) that may be accessed by the computer system client device 204 via one or more connections such as, for example, the network connections described herein. The computer system resources and/or the datacenter may be located locally or a combination of locally and remotely. For example, in some embodiments, a file system and/or directory may be located on a disk located in a local datacenter and the contents of the file system and/or directory may also be replicated to a disk located in a remote datacenter. In some other embodiments, a file system and/or directory may have at least a part of its contents located in one datacenter that may be local (i.e. hosted within the datacenter) and other parts of its contents located in one or more other datacenters that may be local or remote. The storage devices may include physical devices such as those described herein and/or virtual representations of such physical devices. For example, a file system and/or directory storage device may include some amount of physical memory, part of which is dedicated to storage as a virtual disk drive with a file system created on the virtual disk drive. Other such storage devices may be considered as within the scope of this disclosure.

In some embodiments, the service 226 may need access to one or more computer system directory resources such as those described herein. The service 226 may, in some embodiments, include a variety of other computer system entities including, but not limited to, users, other computer systems, processes and/or automated processes and/or other such computer system entities. Access 214 to the system directory resources may, in some embodiments, be provided by a service such as a managed directory service 218, which may provide access to one or more system resources. For example, a directory 208 may be created by a managed directory service 218 within a computing resource service provider, or within a datacenter on the customer premises or within some other such location. Once the directory is created by the managed directory service, the managed directory service can provide access to the directory by providing the URI 214 to services that may wish to join the directory, or may wish to perform authorized commands on the directory or may wish to perform other directory management operations. The managed directory service 218 may provide a variety of services to enable computer systems and/or computer system client devices to manage directories including, but not limited to access for directory management purposes via authentication 220, authorization 222 and directory services 224.

For example, the managed directory service may provide 220 authentication services which may authenticate credentials of a user, computer system, process, automated process or other such entity to at least determine whether that entity is authorized to access the managed directory service to, for example, create the directory, configure the directory to enable computer systems to join to a domain of the directory, extend the directory and/or other such directory management functions. In some embodiments, the credentials may be authenticated by the managed directory service itself, or they may be authenticated by a process, program or service under the control of the managed directory service, or they may be authenticated by a process, program or service that the managed directory service may communicate with, or they may be authenticated by, a combination of these and/or other such services or entities.

The managed directory service 218 may also provide 222 authorization services which may authorize a user, computer system, process, automated process or other such entity to at least determine which actions of one or more possible actions that entity may perform in connection with a directory managed by the managed directory service. For example, actions that an entity may or may not be authorized to perform on a directory include, but are not limited to, creating the directory, describing a set of directories that include the directory, deleting the directory, extending the directory to another directory, creating and/or providing information about snapshots of the directory, deleting snapshots of the directory, restoring the directory from a snapshot of the directory, managing (adding/removing) tags associated with the directory, creating an alias for a URI for the directory, checking if an alias is available and/or deleting an alias for the URI of the directory. Once a directory is created, an administrator of the directory is able to, through the created directory, perform operations on the directory. For example, the administrator may perform actions such as creating file systems, destroying file systems, attaching to file systems, detaching from file systems, providing access links to file systems, reclaiming access links to file systems, allowing reads from file systems, allowing writes to file systems and/or other such file system resource actions.

Actions on system resources may include, but not be limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions may also be included in the available actions. Authorization to perform actions may be managed by an entity such as a credentialing or policy system such as a system that, for example, maintains a set of credentials and/or policies related to a certain entity and may determine, based at least in part on the set of credentials and/or policies which actions an entity is authorized to perform. The actions that an entity may be authorized to perform may be static or may vary according to a number of factors including, but not limited to, time of day, type of credentials, system policies, nature, type or location of the object being accessed or a combination of these and/or other such authorization factors. For example, a computer system entity may be authorized only to read certain files on a file system, to read and write certain other files on a file system, and to add and delete certain other files on a file system. A different computer system entity may be authorized to perform any actions on the file system, but only if those actions are initiated from a certain location and at a certain time. One or more processes may be authorized only to write to a file on a file system, such as, for example, a system log, while other processes may only be authorized to read from the file. As may be contemplated, these are illustrative examples. Other types of operations may be authorized by the managed directory service authorization system and such other types of operations are also considered as being within the scope of the present disclosure.

The managed directory service may also provide 224 directory services which may provide an authenticated entity access 234 to computer system resources according to the authorization credentials and/or policies. For example, in an embodiment where a computer system entity may be authorized to read and write a certain data store on a computer system resource such as a file system resource, the ability to do so may be provided by the directory services. Directory services may provide access to the file system resource by providing links to the file system resource locations such as by a URI object or some other such linkage. The URI may be provided by the computer system client device, or by a process running at the data center, or by a process running on a computer system connected to the datacenter, or by the managed directory service or by a combination of these and/or other such computer system entities. In some embodiments, the directory 208 may be extended 232 to a directory 230 as described herein at least in connection with FIG. 1 and in accordance with at least one embodiment. The managed directory service may provide an authenticated entity access 234 to the directory 230 according to the authorization credentials and/or policies.

In some embodiments, the access to the computer system directory resources may be provided in such a way that the access is invisible to the requesting entity. For example, the access 234 may be provided to a requesting entity as a URI or other such link to a location 210 on directory 208. The location on the computer system resource may be translated into a URI by one or more processes running on the computer system. The service or entity 226 that requested the access to the computer system resource may use the 228 received URI to access the computer system resource without requiring configuration that is dependent on the location of the computer system resource and may, in some embodiments, use the URI to link to the computer system resource to operate as if the service or entity 226 were directly connected to the computer system resource. In some embodiments, where the service is provided access to the extended directory via a link such as a URI 234 which, in turn may have access to the on-premises directory 208 via a link such as a URI 214, the service or entity 226 may have access to one or both of the URIs 214 and 234 and may use one or both of them interchangeably to access on-premises directory 208 and/or the extended directory 230. Operations that, for example, appear to write a set of data to a file that may appear to the service or entity to be located in a location local to the service or entity, may actually package the data into a network packet and may then transfer the packet over the network 216 via the access link 214, to be actually written to a file on the directory 208. As may be contemplated, these are illustrative examples and other types of operations which may be performed by the managed directory service may also be considered as within the scope of the present disclosure.

Figure 3:
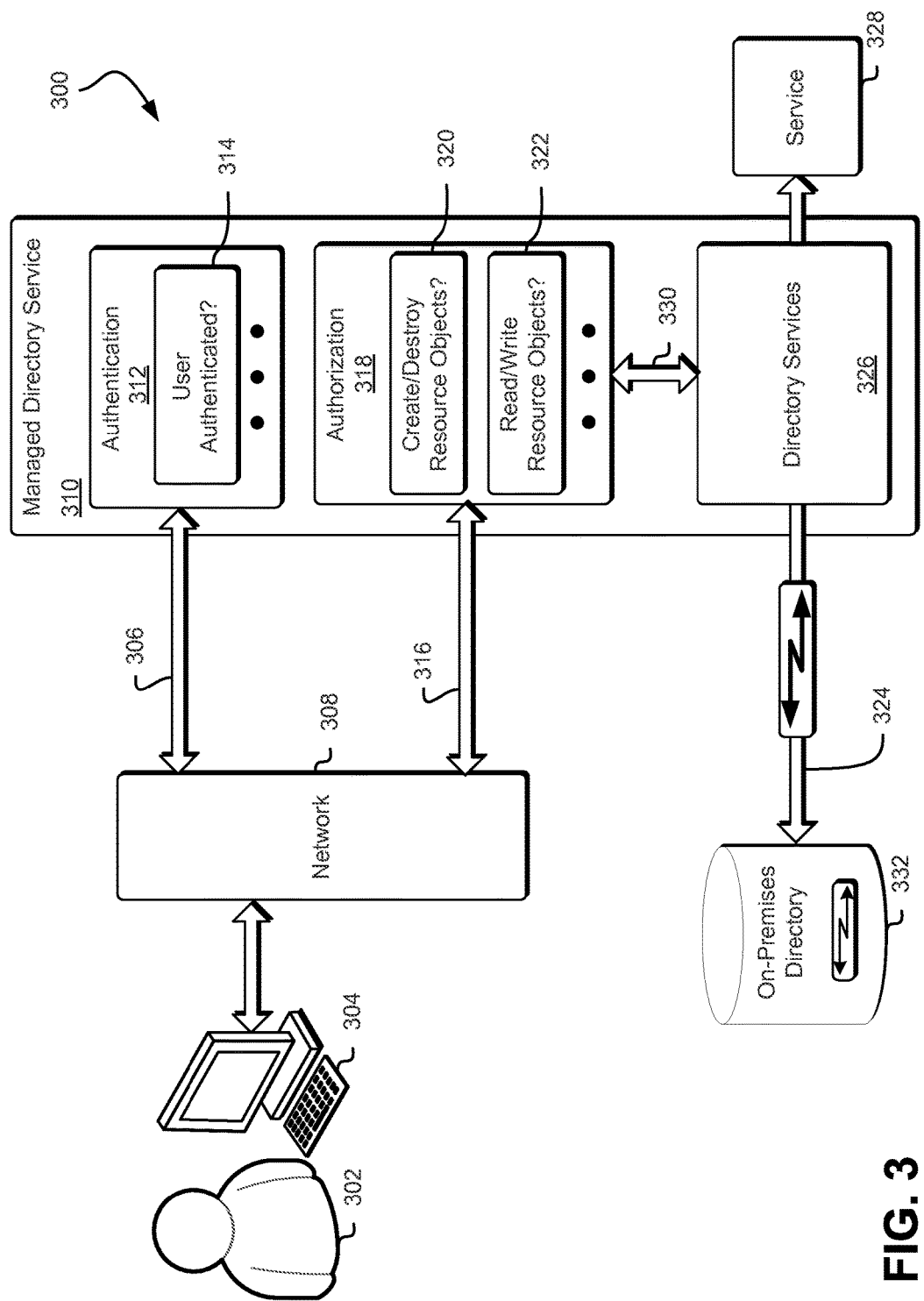
FIG. 3 illustrates an example environment where requests for authentication and authorization for access to computer services by computer system entities may be fulfilled in accordance with at least one embodiment.

FIG. 3 illustrates an environment 300 for servicing user requests for authentication, authorization and access by local and/or remote services to local and/or remote computer system resources on distributed and/or virtualized computer system environments as described herein at least in connection with FIG. 2 and in accordance with at least one embodiment. A computer system entity, user or process 302 may connect to a computer system through a computer system client device 304 and may 306 request authentication of credentials in order to facilitate access by the computer system entity, user or process to one or more local and/or remote services including, but not limited to, managed directory services, cloud services, web services, virtual machine services, database services and/or other such computing resource service provider services. Access may include the ability to create the directory, delete the directory, extend the directory, connect to the directory, join the directory and/or other such directory management operations. For example, a user or process 302 may desire to join a virtual machine managed by a virtual machine service such as service 328 to a directory 332 that the user or process may have previously created. A managed directory service may provide the access via the URI 324 and may, in some embodiments, provide authentication and/or authorization for the user or process 302 to join the virtual machine to the directory. In some embodiments, the command or commands to request authentication of credentials may originate from an outside computer system and/or server, or may originate from an entity, user or process on a remote network location, or may originate from the computer system, or may originate from a user of the computer system client device, or may originate as a result a combination of these and/or other such objects. The command or commands to request authentication of credentials may, in some embodiments, be issued by a privileged user, or by an unprivileged user, or by a process such as an autonomous process, or as a result of an alarm or condition or by a combination of these and/or other system methods and/or entities.

The computer system client device 304 may be connected to the computer system using one or more networks 308 and/or entities associated therewith, such as other servers connected to the network, either directly or indirectly. The computer system client device may include any device that is capable of connecting with the computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the computer system client device 304 may access one or more authentication processes 312 running on and/or under the control of a managed directory service 310 wherein the authentication processes may be configured to at least respond to requests from external processes and to authenticate the credentials of requesting computer system entities, users or processes. For example, the authentication processes may validate 314 whether a requesting computer system entity, user or process is allowed to access the managed directory service. The authentication process may validate access to the managed directory service by verifying a user name and password combination, or by verifying a cryptographic key stored on a hardware, software, firmware or other such device, or by verifying whether the computer system client device is authorized to request access, or by verifying whether the network is authorized to request access or by a combination of these and/or other such verification methods. The authentication process may perform other such authentication tasks and may, in some embodiments, perform authentication tasks in combination with other processes running on and/or with data stored on the computer system and/or on other computer systems.

In some embodiments, a computer system entity, user or process 302 as described herein may connect to a computer system through a computer system client device 304 as described herein, using one or more networks 308 and/or entities associated therewith as described herein, and may 316 request authorization to perform one or more operations and/or processes or otherwise in connection with the directory 332 which may have been created within, and/or may be accessible from, the computing resource service provider, or an isolated virtual network within the computing resource service provider, or within a subnet of the isolated virtual network, or within a datacenter on customer premises, or within a virtual network on the customer premises or within some other such locations. In some embodiments, the requested operation authorization may be a requested authorization to directly perform one or more computer system resource operations. In some embodiments, the requested operation authorization may be a requested operation to indirectly perform one or more computer system resource operations in connection with a directory, such as creating or deleting a directory. For example, the requested operation may be a request for authorization for a remote computer system service, process or entity under the control of the computer system entity, user or process 302 for authorization to perform one or more computer system resource operations. The authorization may be requested from one or more authorization processes 318 running on and/or under the control of a managed directory service 310 wherein the authorization processes may be configured to at least respond to requests from external processes and to authorize the performance of one or more operations and/or processes by the computer system entity, user or process on or otherwise in connection with the directory 332. The computer system resource may be located locally such as in a datacenter on the customer premises, or may be located remotely, or may be located in multiple remote locations such as on a distributed and/or virtual computer system or may be located in a combination of local and/or remote locations. For example, a file system may be located on a local disk located in a local datacenter and the contents of the file system may also be replicated to a one or more remote disks located in one or more remote datacenters. In some embodiments, a file system may have at least a part of its contents located in one datacenter that may be local or remote, and other parts of its contents located in one or more other datacenters.

Examples of operations and/or processes that may be authorized include, but are not limited to, 320 creating and/or destroying resource objects, 322 reading and/or writing resource objects and/or other such system resource operations. Authorization may vary by entity, user or process, by time of the day, by class of entity, by class of user, by class of process, by one or more system policies, by the nature of the request or by a combination of these and/or other such considerations. For example, a computer system entity may be authorized to create files and/or directories but may not be authorized to delete them, or a process may be authorized only to delete files and/or directories that were created by that process and no others, or an entity may be authorized to read certain files in certain directories, but not others. As may be contemplated, these are illustrative examples. Other types of operations may be authorized by the managed directory service authorization system and such other types of operations are also considered as being within the scope of the present disclosure.

In some embodiments, a computer system entity, user or process 302 as described herein may connect to a computer system through a computer system client device 304 as described herein, using one or more networks 308 and/or entities associated therewith as described herein, and may 324 create and/or instantiate one or more local and/or remote services 328 that may request access to a directory 332 for management of the directory 332. The directory may have been created previously in one of one or more locations as described herein and access may be provided to the created directory via the URI 324. In some embodiments, the computer service, process or entity 328 may access one or more directory services processes 326 running on and/or under the control of a managed directory service 310 wherein the directory services processes may be configured to at least respond to requests from external processes and to provide access to one or more file systems. Access to one or more file systems may include access to operations such as operations to read, write, execute, delete, create, instantiate and/or other such operations, on files and/or other file system objects such as directories, applications, data, databases, links to other file systems, system drivers, computer operating systems, virtual machines and/or other such file system objects. In some embodiments, access to operations may be facilitated by communication 330 with one or more authorization processes 318 as described herein, providing authorization according to resource authorization policies contained therein.

Figure 4:
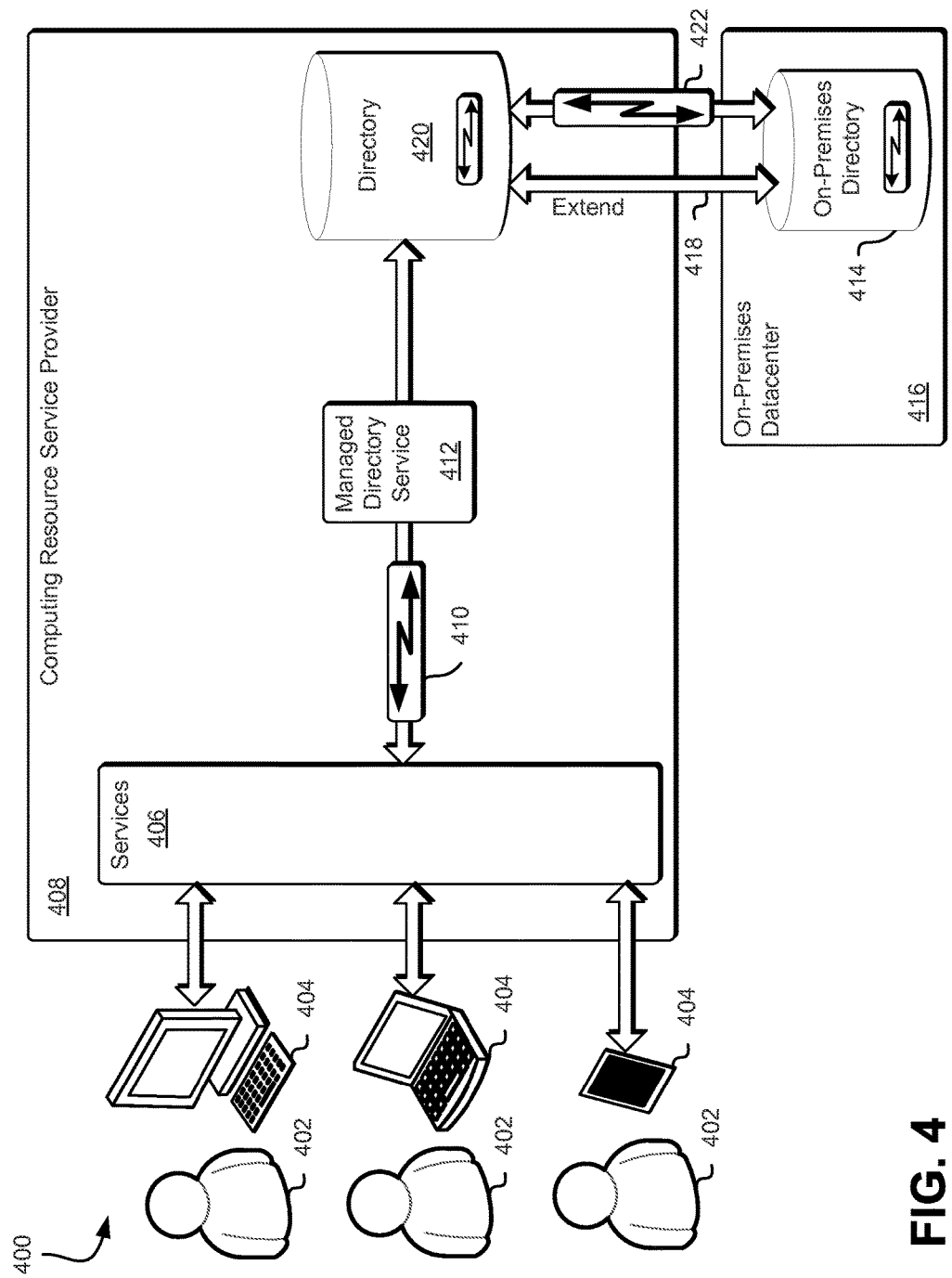
FIG. 4 illustrates an example environment wherein various embodiments may be exercised in accordance with at least one embodiment.

As previously mentioned, the computer system entity, user or process 302 and the computer system client device 304 from FIG. 3 may be among a plurality of entities, users, process and/or devices interconnected in a distributed computing system and/or datacenter environment. FIG. 4 illustrates a distributed computing environment and/or datacenter environment 400 in which various embodiments may be exercised. One or more computer system entities, users or processes 402 may connect via one or more computer system client devices 404 to one or more computer system services 406 via one or more networks 408. Access by the services to one or more local and/or remote computer system directory resources 420 which may be located in the computing resource service provider 408 and may be provided by one or more connections such as one or more URIs 410 via a 412 managed directory service as described herein at least in connection with FIG. 1 and in accordance with at least one embodiment. A local and/or remote system resource may be a 418 extension of a local system resource 414 from local datacenter 416 via URI 422 as described herein at least in connection with FIG. 1 and in accordance with at least one embodiment. The directory 420 may, in some embodiments, be located within an isolated virtual network within the computing resource service provider or may be located within a subnet of the isolated virtual network as described herein. The on-premises directory 414 may, in some embodiments, be located within a virtual network within the customer premises as described herein.

In some embodiments where a directory is located in a datacenter provided by the computing resource service provider, multiple users, services, devices, processes and/or other such computer system entities may access the datacenter and the directory from locations that may access the computing resource service provider, providing access to that directory. In some embodiments, where a directory is located within an isolated virtual network or within a subnet of an isolated virtual network, computer system entities within the isolated virtual network or within the subnet, the directory may be made available to those entities within the isolated virtual network or the subnet. For example, a directory located in a computing resource service provider may be accessed by computer system entities with appropriate authorization from a plurality of devices and from a plurality of locations that are able to access the computing resource service provider. The directory may be shared by users, services, devices, processes and/or other such computer system entities and each may access the directory to, for example, join a domain of the directory, regardless of where those computer system entities are located, provided that those entities have access to the computing resource service provider and have proper credentials. In such embodiments, access to the directory may be provided at least in part by a managed directory service as described herein at least in connection with FIGS. 1 and 2 and in accordance with at least one embodiment.

In some embodiments, where the directory is located in, for example, a datacenter provided by a customer and located on the customer premises, multiple users, services, devices, processes and/or other such computer system entities may, in a similar manner, access the directory from many different locations provided that those entities have access to the datacenter on the customer premises. In such embodiments, the access to the datacenter on the customer premises may be provided at least in part by a managed directory service as described herein at least in connection with FIGS. 1 and 2 and in accordance with at least one embodiment. As may be contemplated, these are illustrative examples and other types and/or arrangements of the locations of the 416 datacenter and the 414 system resource that allow multiple computer system entities to connect to the datacenter and/or system resource may be considered as being within the scope of the present disclosure including, but not limited to, distributed datacenters and/or system resources, virtual datacenters and/or system resources, redundant datacenters and/or system resources, partially local datacenters and/or system resources, isolated virtual networks, subnets of isolated virtual networks, and/or partially remote datacenters and/or system resources. As may also be contemplated, the system resources may include a variety of system resources including, but not limited to, local and/or remote storage locations, system memory, central processing units (CPUs), network interfaces, network bandwidth, display devices, input devices and/or other such computer system resources and these other such resources may also be considered as being within the scope of the present disclosure.

Figure 5:
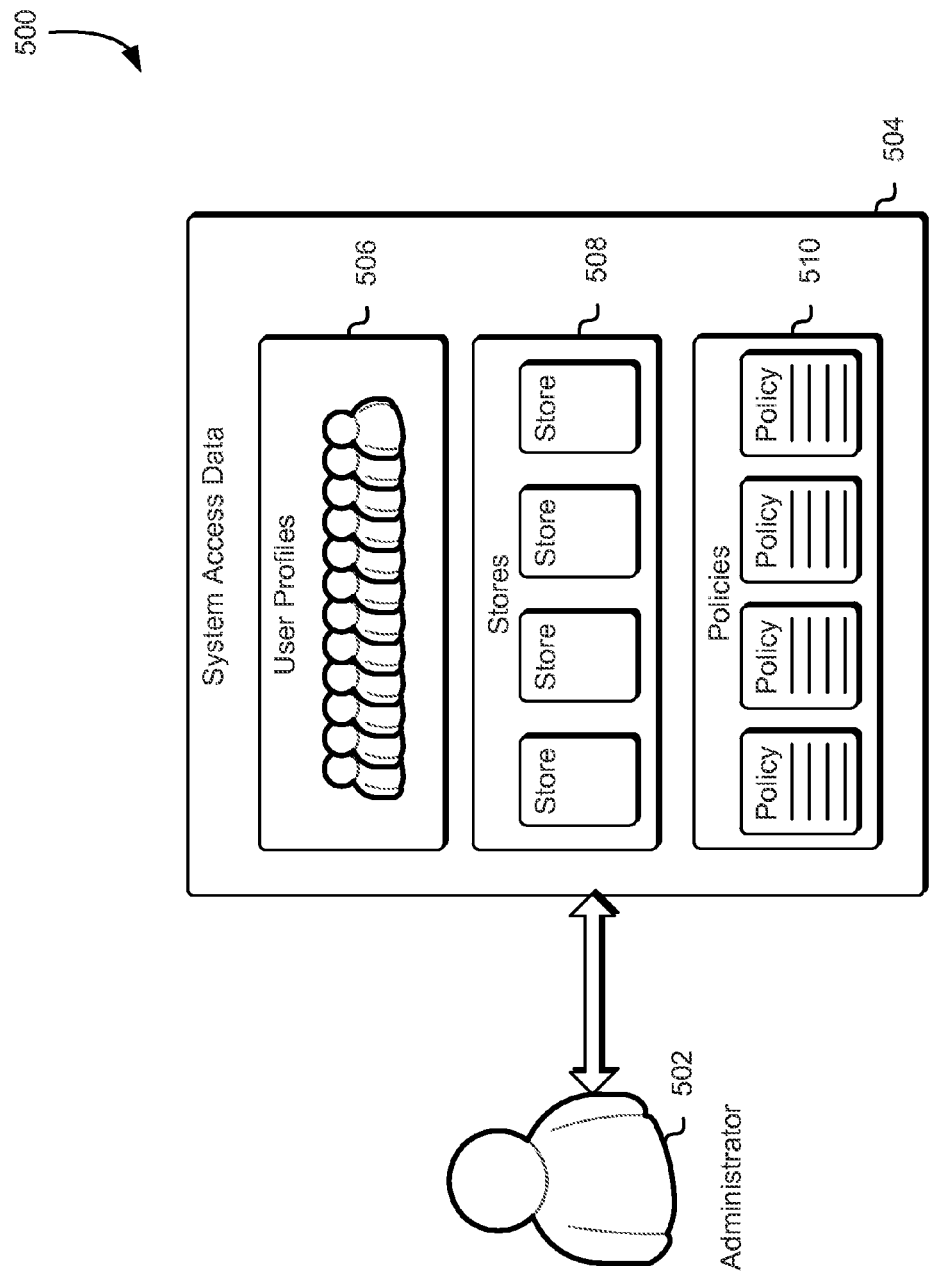
FIG. 5 illustrates an example environment where a central location of authorization and authentication data may be stored in accordance with at least one embodiment.

FIG. 5 illustrates an example environment 500 for maintaining central location user profiles, stores and system policies used for authentication and authorization credentials as described herein at least in connection with FIG. 3 and in accordance with at least one embodiment. An administrator 502 may have a set of system access data 504 which may, in some embodiments, be located in one or more local storage locations that may be located on the customer premises, or may, in some embodiments, be located in one or more remote storage locations that may be located in a computing resource service provider or may, in some embodiments, be located in a storage location that may be located in a combination of local and remote storage locations. In some embodiments, the system access data may contain one or more user profiles 506 which may contain user names, user passwords, user biographical data and/or other such user profile information. User profiles may be used by one or more systems to provide authentication services such as the authentication services described herein at least in connection with FIG. 3 and in accordance with at least one embodiment. In some embodiments, the system access data may contain one or more stores 508 which may contain references to one or more computer system resources. In some embodiments, the system access data may contain one or more polices 510 which may contain one or more policy statements allowing, disallowing and/or limiting access to system resources such as, for example, system services, file systems, directories, machines, virtual machines, applications, documents and/or other such system resources. The policy statements may allow, disallow and/or limit access to system resources based on such factors as the contents of one or more user profiles, the user profile type, the requesting service, the requesting service type, the requesting service location, the time of day, the business value of the user, client, customer, request and/or other such business values or a combination of these and/or other such factors.

Figure 6:
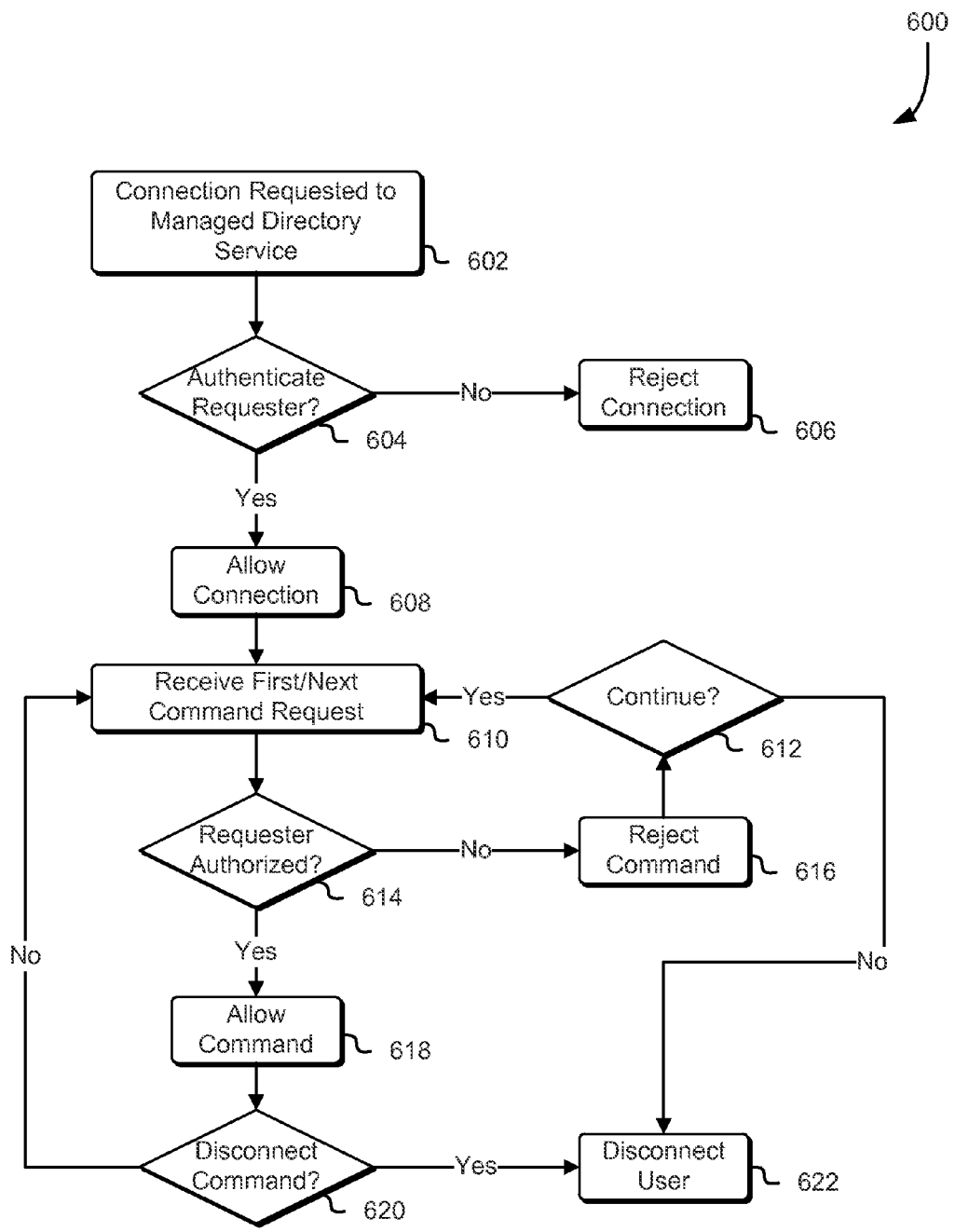
FIG. 6 illustrates an example process for authenticating access to a managed directory service and for authorizing an entity that is authenticated to perform one or more commands in accordance with at least one embodiment.

A managed directory service may provide varying levels of access to different users associated with an account of a computing resource service provider that provides the managed directory service. For example, some users may be able to create and delete directories while other users may lack authorization to delete directories. FIG. 6, accordingly, illustrates an example process 600 for controlling access to management functions of a directory managed by a managed directory service. As discussed in more detail below, the process may be used for authenticating access to a managed directory service and for authorizing an entity that is authenticated to perform one or more commands associated with the managed directory service, as described herein at least in connection with FIG. 3 and in accordance with at least one embodiment. A service such as the managed directory service 310 as described in FIG. 3, or a process associated with a managed directory service may perform the actions illustrated in FIG. 6.

A managed directory service may receive a request 602 to allow the requester to access the managed directory service and one or more of the commands, resources and/or services provided by the managed directory service. In some embodiments, the requester may be a computer system entity, user or process such as the computer system entity, user or process described herein at least in connection with FIG. 1 and in accordance with at least one embodiment. In some embodiments, the request may originate from an outside computer system and/or server, or may originate from an entity, user or process on a remote network location, or may originate from a local computer system, or may originate from a user of a computer system client device, or may originate as a result of a combination of these and/or other such conditions. The command or commands to issue the request may, in some embodiments, be issued by a privileged user, or by an unprivileged user, or by an autonomous process, or as a result of an alarm or condition or by a combination of these and/or other methods.

The managed directory service may first 604 authenticate the user using processes such as the processes described herein at least in connection with FIG. 3 and in accordance with at least one embodiment. The managed directory service may, in some embodiments, use system access data such as the user profile data described herein at least in connection with FIG. 5 and in accordance with at least one embodiment. If the requester is 604 authenticated, the managed directory service may 608 allow the connection and 610 begin receiving commands from the requester. If the requester is 604 not authenticated, the managed directory service may 606 reject the connection.

Once the managed directory service 610 begins receiving commands from the requester, the managed directory service may 614 determine whether the requester is authorized to perform each command. Examples of commands that the managed directory service may receive include, but are not limited to, commands to create or destroy directories, commands to manage directory services, commands to manage directory tags, commands to manage directory aliases, commands to read to and/or write from directories and/or other such commands. The managed directory service may authorize the requester to perform each command using authorization processes such as the authorization processes described herein at least in connection with FIG. 3 and in accordance with at least one embodiment. The managed directory service may, in some embodiments, use system access data such as the user profile and/or policy data described herein at least in connection with FIG. 5 and in accordance with at least one embodiment.

If the requester is 614 not authorized to perform the received command, the managed directory service may 616 reject the particular command and may then determine whether it should 612 continue processing commands from the requester. In some embodiments, some rejected commands may result in not performing the command, some rejected commands may result in alerting the requester and/or other computer system entities that the command has been rejected, some rejected commands may result in terminating the connection to the requester and some rejected commands may result in a combination of these and/or other such actions. If the managed directory service does elect to 612 continue receiving commands from the requester, the managed directory service may 610 wait for the next command. If the managed directory service does not elect to 612 continue, the managed directory service may 622 disconnect the requester. In some embodiments, 622 disconnecting the requester may include disconnecting the requester, notifying the requester of the disconnection, notifying one or more other computer system entities of the disconnection or a combination of these and/or other such disconnection actions.

If the requester is 614 authorized to perform the received command, the managed directory service may 618 allow the command which may include performing the command, alerting the requester that the command is allowed, alerting one or more other system entities that the command is allowed, requesting one or more other system entities to perform the command or a combination of these and/or other such responses. The received command and/or a response to the 618 allow command may include at least in part a 620 request to disconnect which may cause the managed directory service to 622 disconnect the requester. If the managed directory does not receive a 620 disconnect command, the managed directory service may 610 wait for the next command.

Figure 7:
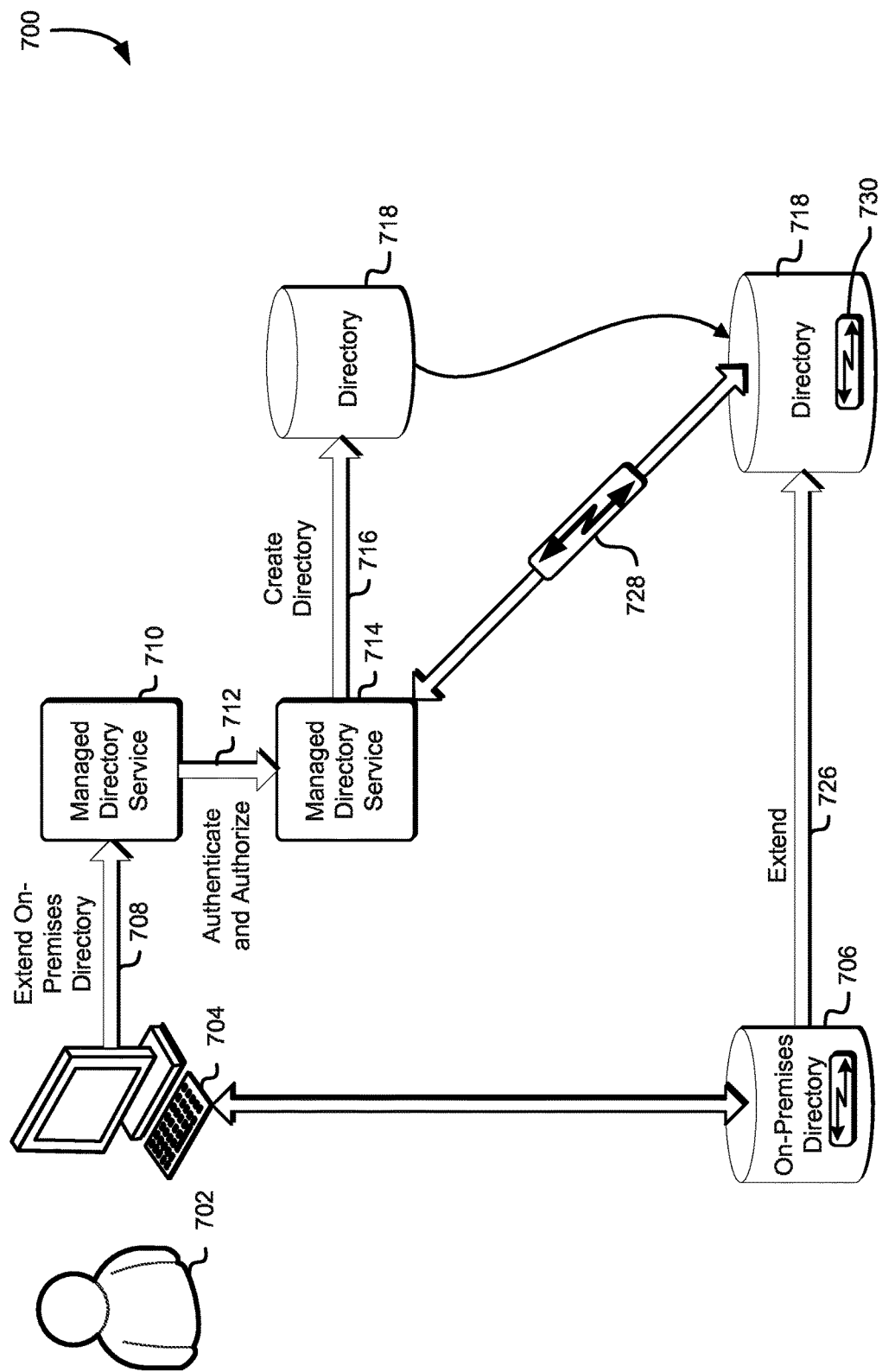
FIG. 7 illustrates an example environment where a local system resource may be extended to a remote system resource in accordance with at least one embodiment.

FIG. 7 illustrates an example environment 700 for extending a local directory such as an on-premises directory to a remote system directory such as a directory located within a computing resource service provider as described herein at least in connection with FIG. 1 and in accordance with at least one embodiment. A computer system entity such as computer system user, process or service may connect to a local and/or remote system resource using one or more connection protocols such as network protocols or other such communication protocols over one or more connections such as the network connections described herein. A connection between a computer system entity and a computer system resource may, for example, be a one way connection, a two-way connection, a read-only connection, a read-write connection or a combination of these and/or other connection types. In some embodiments, the computer system entity 702 may issue one or more commands via a 704 computer system client device to 708 extend the local system directory to a remote system directory. The command or commands to extend a local system directory may, in some embodiments, be issued by a privileged user, or by an unprivileged user, or by a process such as an autonomous process, or as a result of an alarm or condition or by a combination of these and/or other system methods and/or entities. The command or commands to extend a local system directory may, in some embodiments, be issued to a managed directory service 710 such as the managed directory service described herein at least in connection with FIG. 3 and in accordance with at least one embodiment.

In some embodiments, the managed directory service may first 712 authenticate and authorize the command to extend the local system directory and, if authenticated and authorized, the managed directory service 714 may 716 create the directory 718 as described herein at least in connection with FIG. 1 and in accordance with at least one embodiment. The managed directory service 710 may be, in some embodiments, the same as the managed directory service 714. After the remote directory resource is created, the command to extend the local system directory may be issued to the local system directory 706, which will 726 extend the local system directory to the 718 remote system directory. The computer system client device may also provide a link such as a URI to the managed directory service so that the managed directory service may 728 connect to the remote system directory via a link such as a URI 730.

Figure 8:
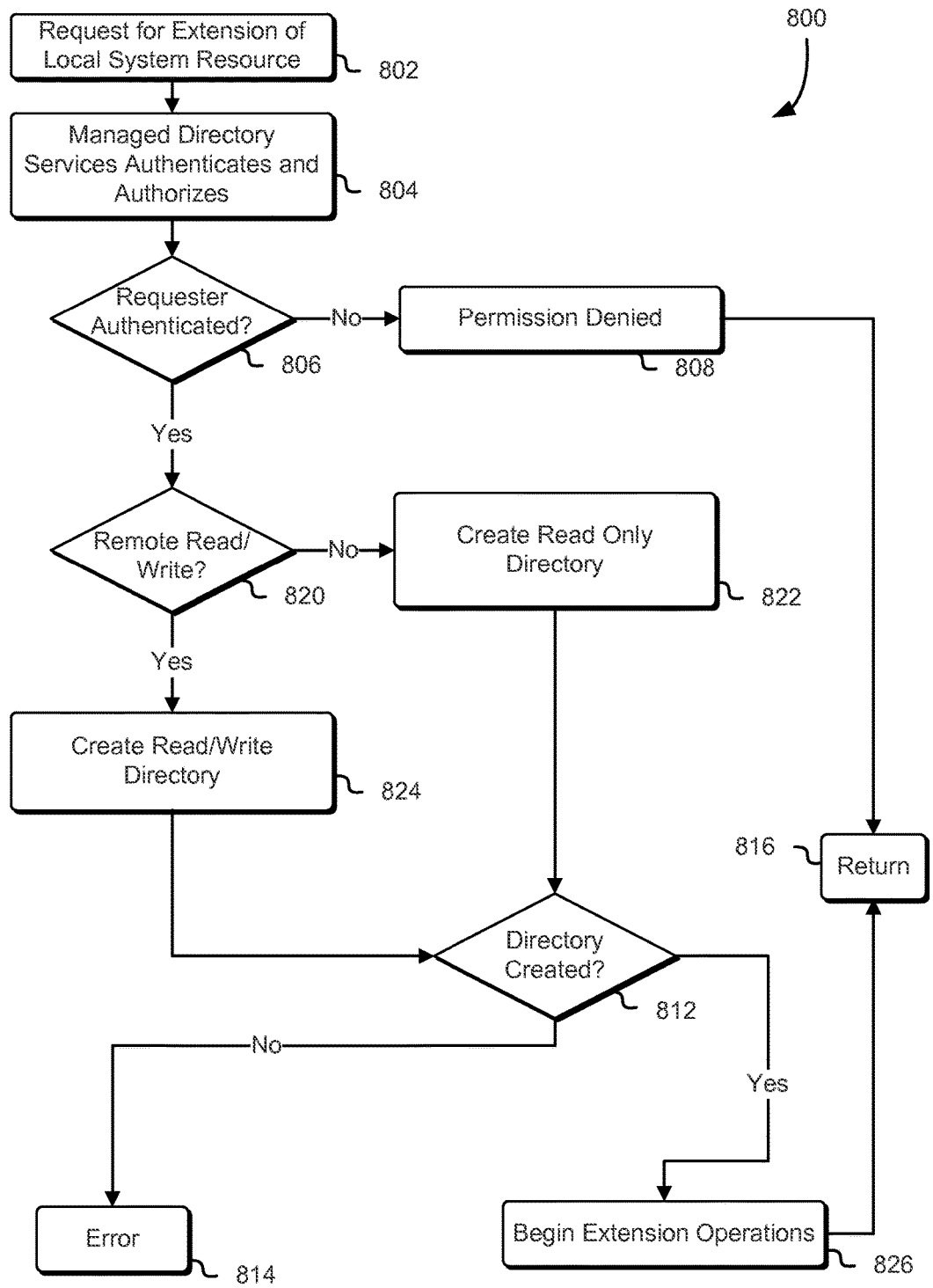
FIG. 8 illustrates an example process for extending a local system resource to a remote system resource using a managed directory service in accordance with at least one embodiment.

FIG. 8 illustrates an example process 800 for extending a local system directory such as an on-premises directory to a remote system directory such as a directory located within a computing resources service provider using a managed directory service such as the managed directory service described herein at least in connection with FIG. 3 and in accordance with at least one embodiment. A service such as the managed directory service 310 as described in FIG. 3, or a process associated with a managed directory service may perform the actions illustrated FIG. 8.

A managed directory service may receive a request 802 to extend a local system directory. In some embodiments, the requester may be a computer system entity, user or process such as the computer system entity, user or process described herein at least in connection with FIG. 1 and in accordance with at least one embodiment. In some embodiments, the request may originate from an outside computer system and/or server, or may originate from an entity, user or process on a remote network location, or may originate from a local computer system, or may originate from a user of a computer system client device, or may originate as a result of a combination of these and/or other such conditions. The command or commands to issue the request may, in some embodiments, be issued by a privileged user, or by an unprivileged user, or by an autonomous process, or as a result of an alarm or condition or by a combination of these and/or other methods.

The managed directory service may first 804 authenticate and authorize the request and, if 806 the request or the requester is not authorized to perform such an operation then 808, permission will be denied and the managed directory service may 816 return. If 806 the managed directory service is able to authenticate and authorize the request and/or the requester, then the managed directory service may determine 820 if the access to the directory is read-only or read/write. Depending on whether the remote system has 820 read only or read/write access to the directory, the managed directory service may either 822 create a read-only directory or may 824 create a read/write directory. The remote system resource may be created by copying at least a part of the contents, state and/or structure from the local directory to the remote directory. If the managed directory service 812 fails to create and/or initialize the directory then the managed directory service may issue 814 an error. If the cross-premises directory service 812 succeeds in creating and/or initializing the remote directory then cross-premises directory service may 826 begin extension operations before 816 returning.

Figure 9:
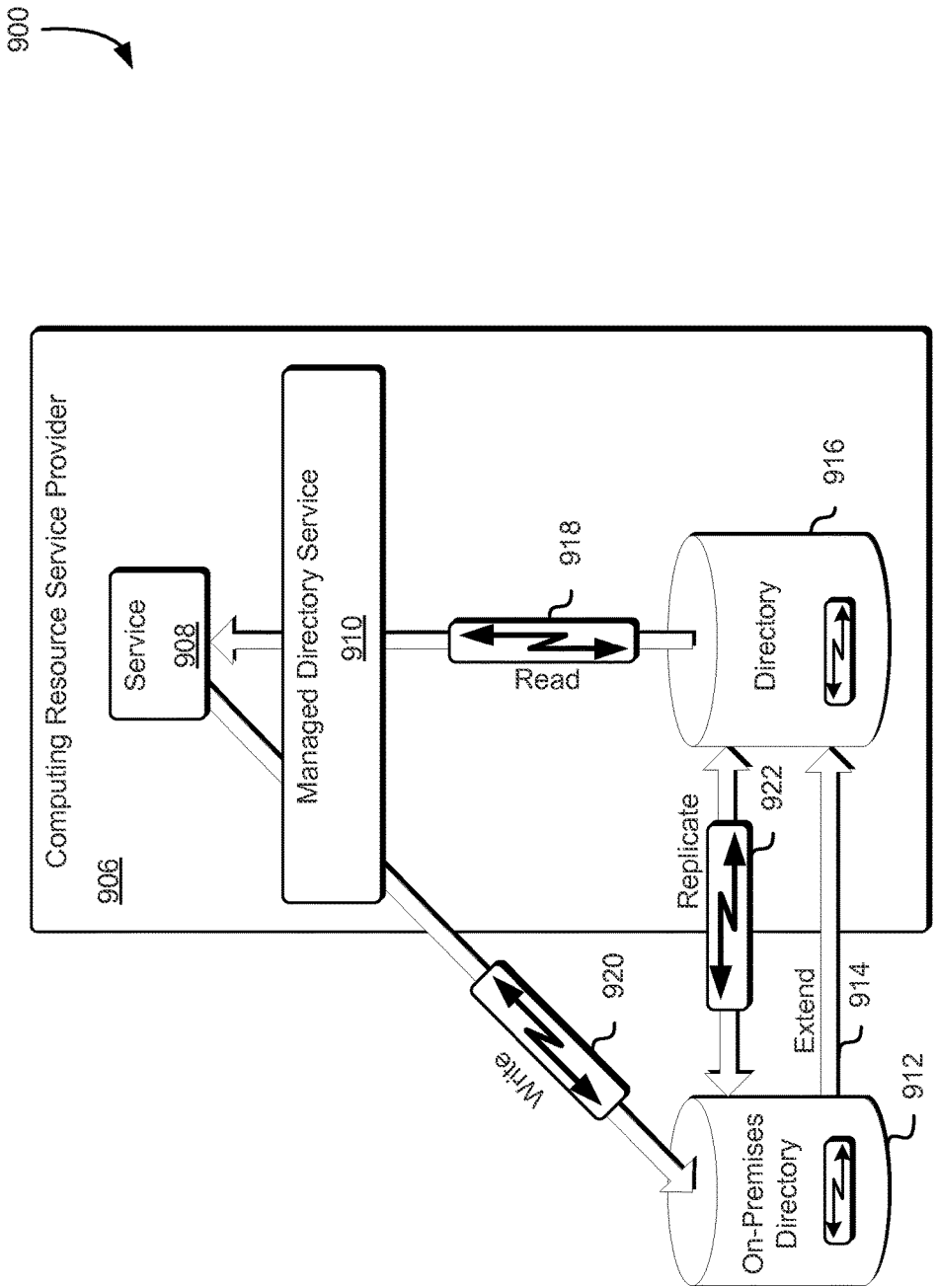
FIG. 9 illustrates an example environment where a local resource may be extended to a remote resource with read-only permissions in accordance with at least one embodiment.

FIG. 9 illustrates an example environment 900 for extending a local directory to a remote directory with read-only permissions using a managed directory service as described herein at least in connection with FIG. 3 and in accordance with at least one embodiment. A service 908 in a computing resource service provider 906 may have 918 read-only access to a remote directory 916 that is an extension 914 of a local directory such as an on-premises directory 912 wherein the extension is as described herein at least in connection with FIG. 1 and in accordance with at least one embodiment. The service may read from the remote directory via a 918 link such as a URI provided by a managed directory service 910. Because the service does not have write access to the remote directory 916, the service may not write to the remote directory. In some embodiments, the service may write to the local directory 912 via a 920 link such as a URI provided by a managed directory service 910. In such embodiments, the writes to the local directory may be replicated to the remote directory via the replicate link such as a URI 922. In some embodiments, the write may instead be directed to the directory 916 which may, upon determining that there is no write access allowed, redirect the write to the local resource via the replicate link such as a URI 922.

Figure 10:
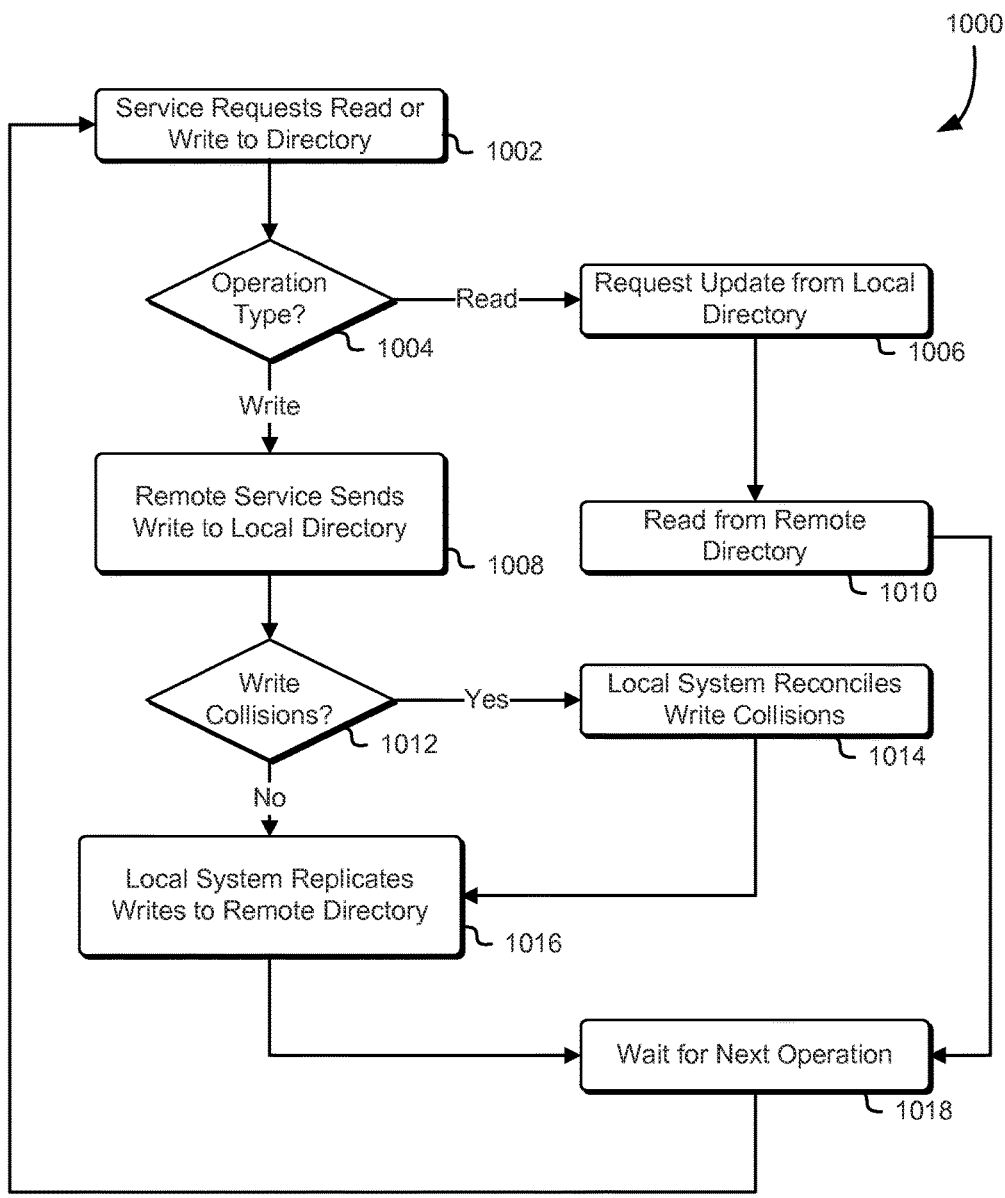
FIG. 10 illustrates an example process for reading and writing to a read-only system resource in accordance with at least one embodiment.

FIG. 10 illustrates an example process 1000 for reading and writing to a read-only directory associated with a managed directory service, as described herein at least in connection with FIG. 3 and in accordance with at least one embodiment. A service such as the managed directory service 310 as described in FIG. 3, or a process associated with a managed directory service may perform the actions illustrated in process 1000.

A managed directory service may receive a request 1002 to read or write to a read-only directory. In some embodiments, the requester may be a computer system entity, user or process such as the computer system entity, user or process described herein at least in connection with FIG. 1 and in accordance with at least one embodiment. In some embodiments, the request may originate from an outside computer system and/or server, or may originate from an entity, user or process on a remote network location, or may originate from a local computer system, or may originate from a user of a computer system client device, or may originate as a result of a combination of these and/or other such conditions. The command or commands to issue the request may, in some embodiments, be issued by a privileged user, or by an unprivileged user, or by an autonomous process, or as a result of an alarm or condition or by a combination of these and/or other methods.

If the 1004 operation type is a read, the managed resource service may in some embodiments 1006 request an update and/or a synchronization of data from the local directory such as anon-premises directory to the remote directory such as a directory located within an computing resources service provider before performing the read. In some embodiments, the update and/or synchronization may occur as a result of a command issued by one or more processes, or may occur automatically, or may occur as the result of a system timer or may not occur at all. After the update, the managed directory service may 1010 read from the remote directory and then may 1018 wait for the next read or write request.

If 1004 the operation type is a write operation, and the service does not have write permission to the remote directory, the service may instead 1008 send the write to the local directory. The local directory may 1012 determine whether there are any write collisions and, if it is determined that there are write collisions, may first 1014 reconcile the write collisions. When the directory contains a computer file system, write collisions may occur when a plurality of processes attempt to write data to the same file or other such file system location. Write collisions may be reconciled for potential errors before the write is allowed. In some embodiments, write collisions may be reconciled by selecting one process as the authority on data, reconciling write collisions in favor of the authoritative process. Once the write collisions are reconciled at the local directory, they may be 1016 replicated from the local directory back to the remote directory and the managed directory service may then 1018 wait for the next read or write request. As may be contemplated, these operations are illustrative examples of the types of operations that may be performed using extended directories and other operations may be considered as being within the scope of the present disclosure. In some embodiments, process 1000 may be performed using a plurality of local and/or remote directories, with one or more writable directories resolving write collisions according to the particular system.

In some embodiments, the authoritative or master directory may be the local, or on-premises directory as described herein at least in connection with FIG. 10. In some embodiments, the authoritative or master directory may be the remote or computing resource service provider directory. In such embodiments, where the authoritative or master directory is the computing resource service provider directory, the write collisions in step 1012 may be evaluated by the managed directory service. If there are any write collisions, then the managed directory service may reconcile collisions in step 1014. In some embodiments, the on-premises directory and the computing resource service provider directory and/or one or more services associated with these entities may work cooperatively to determine if there are write collisions and/or to reconcile those collisions.

Figure 11:
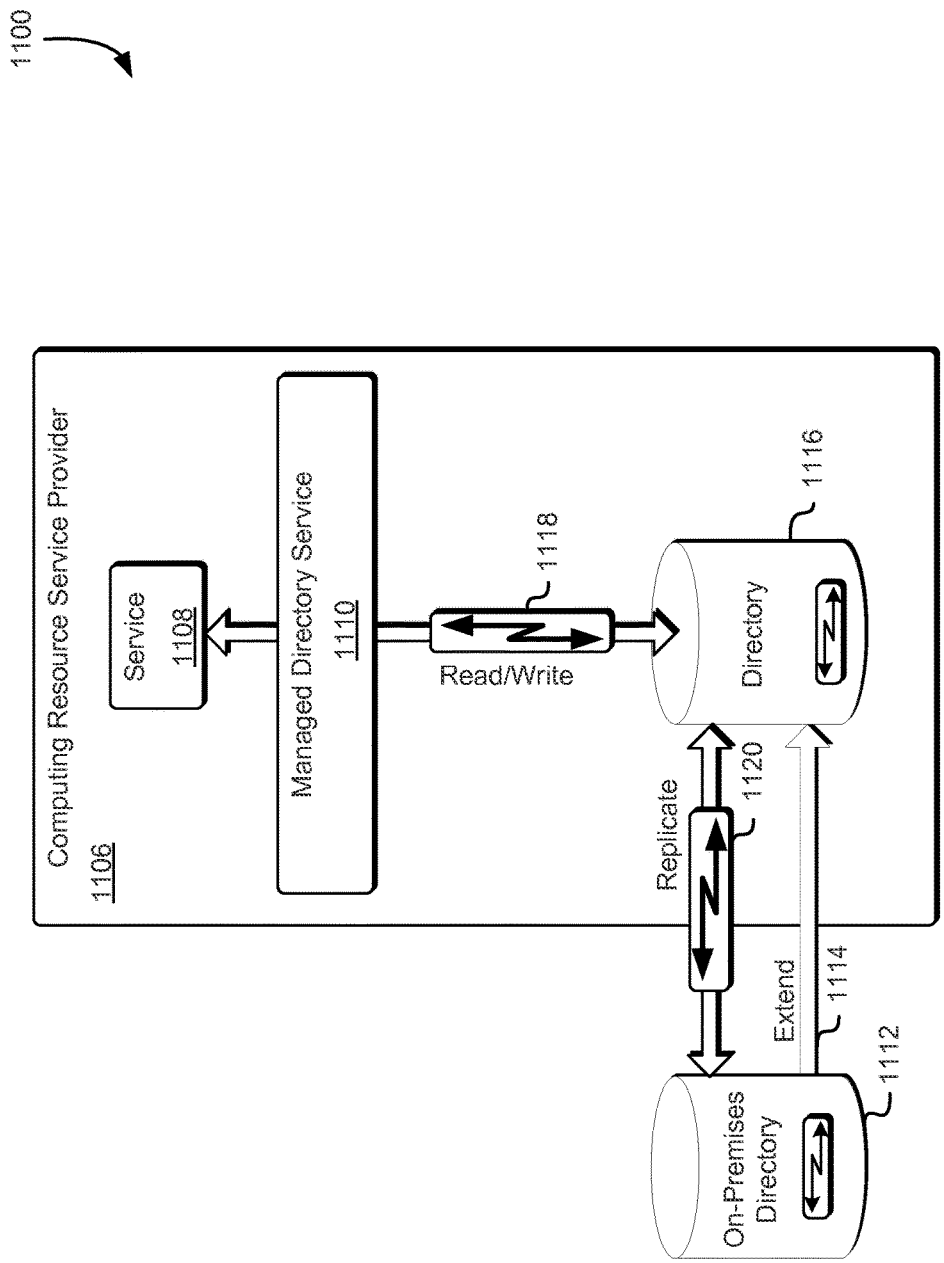
FIG. 11 illustrates an example environment where a local resource may be extended to a remote resource with read/write permissions in accordance with at least one embodiment.

FIG. 11 illustrates an example environment 1100 for extending a local (on-premises) directory to a remote (computing resource service provider) directory with read/write permissions using a managed directory service as described herein at least in connection with FIG. 3 and in accordance with at least one embodiment. A service 1108 in a computing resource service provider 1106 may have 1118 read/write access to a remote directory 1116 that is an extension 1114 of a local directory 1112 wherein the extension is as described herein at least in connection with FIG. 1 and in accordance with at least one embodiment. The service may read from the remote directory via 1118 a link such as a URI provided by a managed directory service 1110. The service may write to the remote directory via the same link provided by a managed directory. In some embodiments, the service may also read and/or write to the local directory 1112 via a link such as a URI such as the link 920 as described herein in connection with FIG. 9. In such embodiments, the writes to the local directory may be 1120 replicated to the remote directory.

Figure 12:
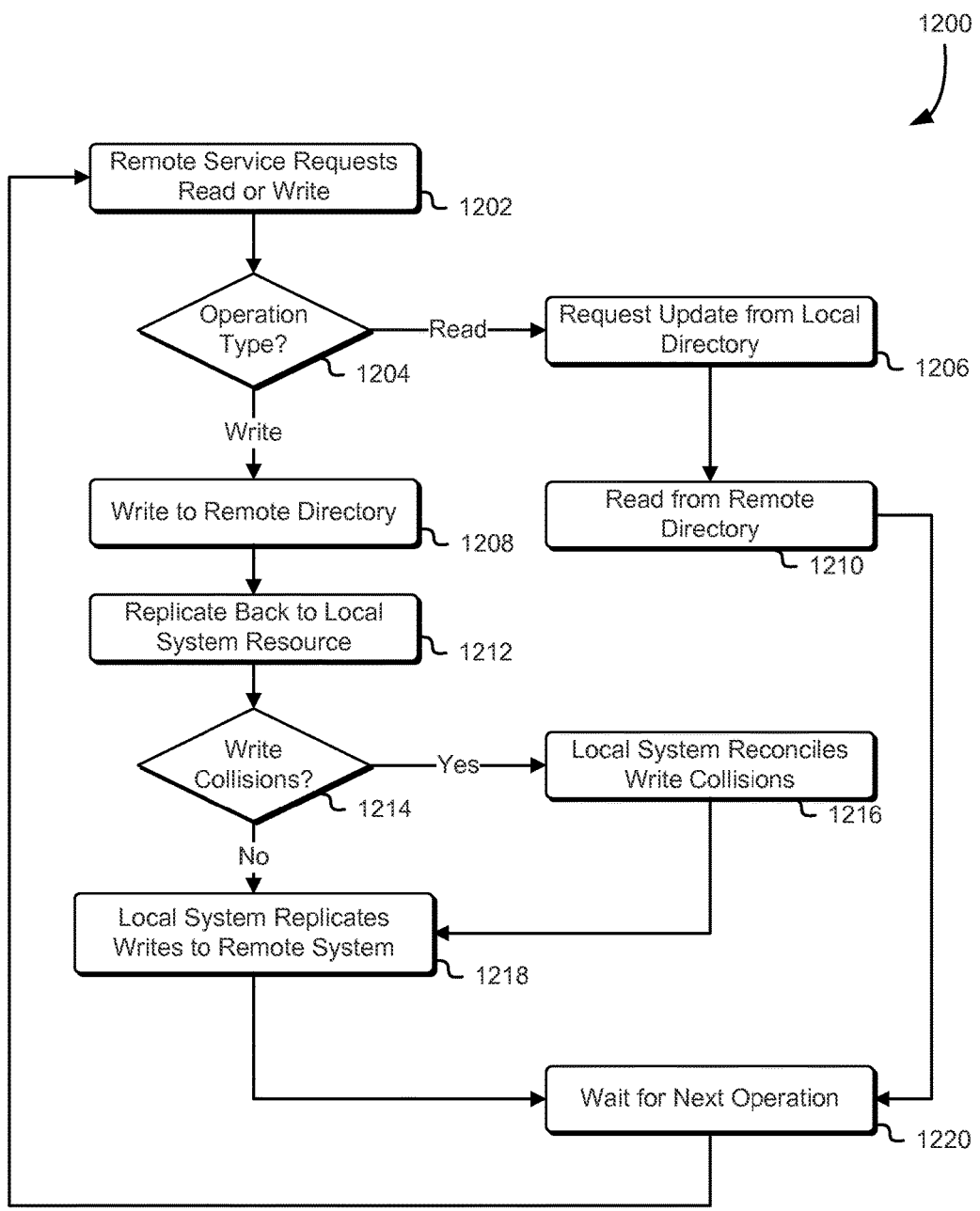
FIG. 12 illustrates an example process for reading and writing to a system resource in accordance with at least one embodiment.

FIG. 12 illustrates an example process 1200 for reading and writing to a directory associated with a managed directory service, as described herein at least in connection with FIG. 3 and in accordance with at least one embodiment. A service such as the managed directory service 310 as described in FIG. 3, or a process associated with a managed directory service may perform the actions illustrated in process 1200.

A managed directory service may receive a request 1202 to read or write to a directory. In some embodiments, the requester may be a computer system entity, user or process such as the computer system entity, user or process described herein at least in connection with FIG. 1 and in accordance with at least one embodiment. In some embodiments, the request may originate from an outside computer, system and/or server, or may originate from an entity, user or process on a remote network location, or may originate from a local computer system, or may originate from a user of a computer system client device, or may originate as a result of a combination of these and/or other such conditions. The command or commands to issue the request may, in some embodiments, be issued by a privileged user, or by an unprivileged user, or by an autonomous process, or as a result of an alarm or condition or by a combination of these and/or other methods.

If the 1204 operation type is a read, the managed resource service may in some embodiments 1206 request an update and/or a synchronization of data from a local directory (such as an on-premises directory) to a remote directory (such as a computing resource service provider directory) before performing the read. The update and/or synchronization may occur as a result of a command issued by one or more processes, or may occur automatically, or may occur as the result of a system timer or may not occur at all. After the update, the managed directory service may 1210 read from the remote directory and then may 1220 wait for the next read or write request.

If 1204 the operation type is a write operation, the service may 1208 send the write to the remote directory and may also 1212 replicate the write back to the local directory in order to maintain synchronization between the two systems. The local directory may 1214 determine whether there are any write collisions and, if it is determined that there are write collisions, may first 1216 reconcile the write collisions. When the directory contains a computer system file system, write collisions may occur when a plurality of processes attempt to write data to the same file or other such file system location. Write collisions may be reconciled for potential errors before the write is allowed. In some embodiments, write collisions may be reconciled by selecting one process as the authority on data, reconciling write collisions in favor of the authoritative process. Once the write collisions are reconciled at the local directory, they may be 1218 replicated from the local directory back to the remote directory and the managed directory service may then 1220 wait for the next read or write request. As may be contemplated, these operations are illustrative examples of the types of operations that may be performed using directory, and other operations may be considered as being within the scope of the present disclosure.

The process 1200 described herein assumes that the local directory is the authoritative directory in that the local directory resolves conflicts or collisions in its favor. In some embodiments, the remote directory may be the authoritative directory and may perform the reconciliation before 1212 replicating the writes back to the local directory. In some embodiments, the local directory and the remote directory may share authoritative duties, negotiating between them as to which may reconcile write collisions and/or how those write collisions may be resolved. Process 1200 may be performed using a plurality of local and/or remote directories, with one or more directories resolving write collisions according to the particular system embodiment.

Figure 13:
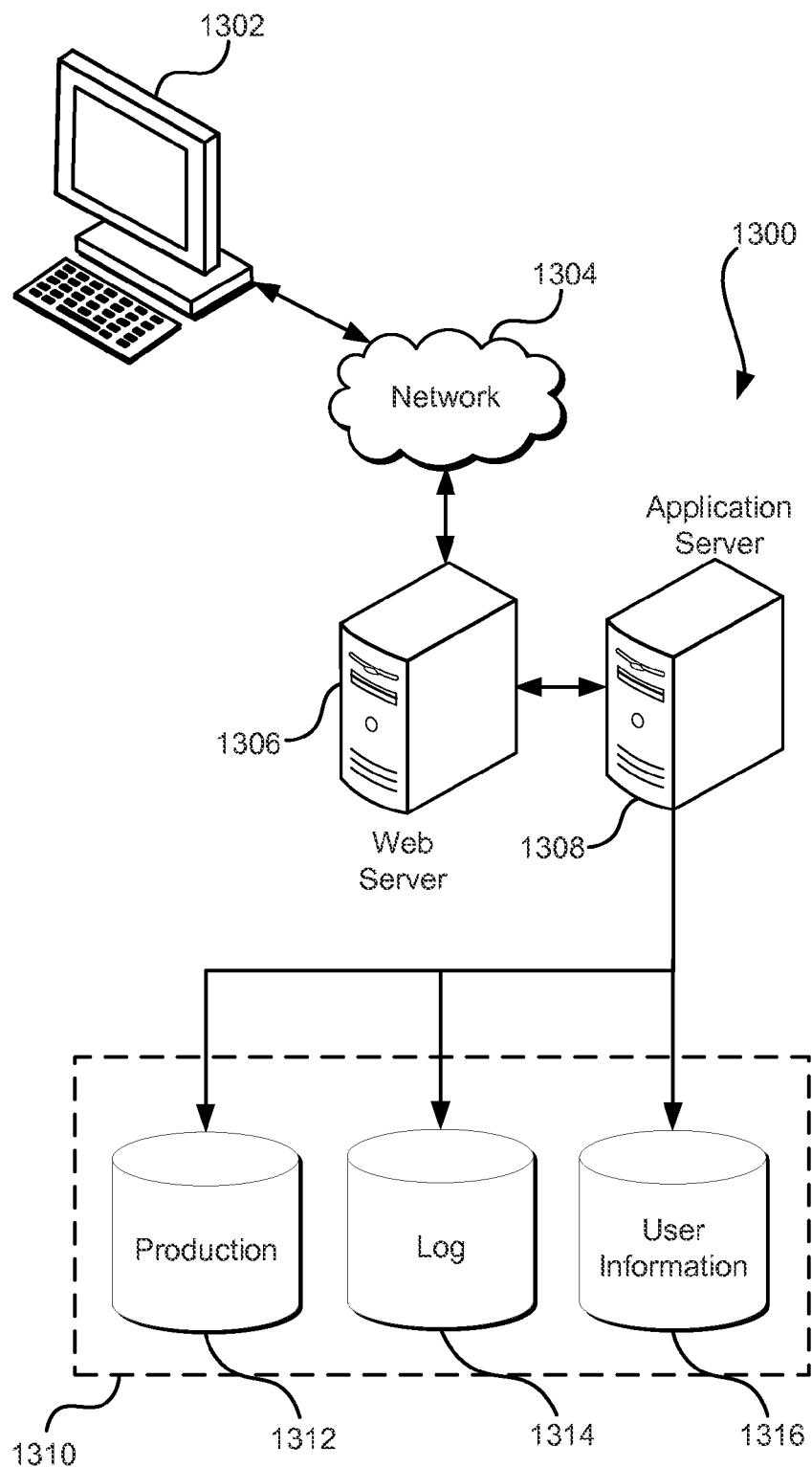
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/ or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a managed directory service, a request from a customer of a computing resources service provider to extend a customer computer system directory hosted in a customer computing environment by at least creating an extended customer computer system directory in a virtual network managed on behalf of the customer by the computing resources service provider in a computing environment of the computing resource service provider, the customer computer system directory referencing a set of data stored in the customer computing environment, wherein extending the customer computer system directory provides a service of the computing resource service provider access to the set of data based at least in part on a uniform resource identifier associated with the customer computer system directory;
   determining whether fulfillment of the request is authorized based at least in part on a first set of credentials associated with the customer;
   obtaining, by the managed directory service, information usable to access the customer computer system directory, the information based at least in part on a second set of credentials associated with the customer computer system directory; and
   using the information to replicate the customer computer system directory from the customer computing environment to the extended customer computer system directory hosted in the computing environment of the computing resource service provider, based at least in part on the second set of credentials.

2. The computer-implemented method of claim 1, wherein the extended customer computer system directory utilizes a read-only replica of the customer computer system directory.

3. The computer-implemented method of claim 2, wherein the extended customer computer system directory is configured to cause requests to modify the customer computer system directory received by the read-only replica to be processed by the customer computer system directory in the customer computing environment.

4. The computer-implemented method of claim 1, further comprising:
   receiving information indicative of changes to the customer computer system directory; and
   synchronizing the extended customer computer system directory in accordance with the information indicative of the changes.

5. The computer-implemented method of claim 1, wherein the extended customer computer system directory is configured to fulfill requests to perform directory write operations and to cause the customer computer system directory to be updated in accordance with the fulfilled requests.

6. The computer-implemented method of claim 1, wherein the extended customer computer system directory is configured such that, for each non-administrative user of a set of non-administrative users of the extended customer computer system directory, the non-administrative user is able to use a single set of credentials to authenticate with the extended customer computer system directory using a service of computing resource service provider.

7. A system, comprising:
   one or more processors; and
   memory to store executable instructions that, as a result of execution by the one or more processors, cause the system to at least:
      receive a request from a customer of a computing resources service provider to extend a customer computer system directory hosted in a customer computing environment by at least instantiating an extended customer computer system directory in a virtual network managed on behalf of the customer by the computing resource service provider in a computing environment of the computing resource service provider, the customer computer system directory referencing a set of data stored in the customer computing environment, wherein extending the customer computer system directory provides a service of the computing resource service provider access to the set of data based at least in part on a uniform resource locator associated with the customer computer system directory;
      determine whether fulfillment of the request is authorized based at least in part on a first set of credentials associated with the customer;
      obtain information usable to access the customer computer system directory, the information based at least in part on a second set of credentials associated with the customer computer system directory; and
      use the information to replicate at least a portion of the customer computer system directory from the customer computing environment to the extended customer computer system directory hosted by the computing resources service provider.

8. The system of claim 7, wherein the extended customer computer system directory is read-only.

9. The system of claim 8, wherein the extended customer computer system directory is configured to:
   receive requests to update the extended customer computer system directory; and
   cause the received requests to be fulfilled by the customer computer system directory hosted in the customer computing environment.

10. The system of claim 7, wherein the extended customer computer system directory is configured to:
    receive requests to update the extended customer computer system directory; and
    cause the received requests to be fulfilled by the customer computer system directory hosted in the customer computing environment.

11. The system of claim 7, wherein the instructions that cause the system to manage the extended customer computer system directory, if executed by the one or more processors, cause the system to perform management operations on the extended customer computer system directory, the management operations including updates to executable code used to operate the extended customer computer system directory.

12. The system of claim 11, wherein:
    the request specifies a domain name system in a computing environment of the customer; and
    the extended customer computer system directory is configured to utilize the specified domain name system to communicate with the customer computer system directory.

13. A non-transitory computer-readable storage medium comprising executable instructions that, as a result of being executed by one or more processors of a computer system, cause the computer system to at least:
    receive a request from a customer of a computing resources service provider to extend a customer computer system directory hosted in a customer computing environment by at least creating an extended customer computer system directory in a virtual network managed on behalf of the customer by the computing resources service provider in a computing environment of the computing resource service provider, the customer computer system directory referencing a set of data stored in the customer computing environment, wherein extending the customer computer system directory provides a service of the computing resource service provider access to the set of data based at least in part on a uniform resource locator associated with the customer computer system directory;

determine whether fulfillment of the request is authorized based at least in part on a first set of credentials associated with the customer;

obtain information usable to access the customer computer system directory, the information based at least in part on a second set of credentials associated with the customer computer system directory; and use the information to replicate at least a portion of the customer computer system directory from the customer computing environment to the extended customer computer system directory of the computing resources service provider.

14. The non-transitory computer-readable storage medium of claim 13, wherein the extended customer computer system directory is read-only.

15. The non-transitory computer-readable storage medium of claim 14, wherein the extended customer computer system directory is configured to:

receive requests to update the extended customer computer system directory; and cause the received requests to be fulfilled by the customer computer system directory hosted in the customer computing environment.

16. The non-transitory computer-readable storage medium of claim 13, wherein the extended customer computer system directory is configured to:

receive requests to update the extended customer computer system directory; and cause the received requests to be fulfilled by the customer computer system directory hosted in the customer computing environment.

17. The non-transitory computer-readable storage medium of claim 13, wherein the instructions that cause the system to manage the extended customer computer system directory, when executed by the one or more processors, cause the system to perform management operations on the extended customer computer system directory, the management operations including updates to executable code used to operate the extended customer computer system directory.

18. The non-transitory computer-readable storage medium of claim 13, wherein:

the request specifies a domain name system in a computing environment of the customer; and the extended customer computer system directory is configured to utilize the domain name system in the computing environment of the customer to communicate with the customer computer system directory.

* * * * *